(12) United States Patent
Komatsu et al.

(10) Patent No.: US 8,081,375 B2
(45) Date of Patent: Dec. 20, 2011

(54) ELECTROPHORETIC SHEET, ELECTROPHORESIS APPARATUS, METHOD FOR MANUFACTURING AN ELECTROPHORESIS APPARATUS AND ELECTRONIC DEVICE

(75) Inventors: Harunobu Komatsu, Matsumoto (JP); Hitoshi Yamamoto, Chino (JP); Mitsuo Kushino, Kawabe-gun (JP); Tomoyuki Kuwamoto, Nara (JP)

(73) Assignees: Seiko Epson Corporation, Tokyo (JP); Nippon Shokubai Co., Ltd., Osaka-shi (JP)

( * ) Notice: Subject to any disclaimer, the term of this patent is extended or adjusted under 35 U.S.C. 154(b) by 171 days.

(21) Appl. No.: 12/449,525

(22) PCT Filed: Feb. 21, 2008

(86) PCT No.: PCT/JP2008/053704
§ 371 (c)(1),
(2), (4) Date: Aug. 12, 2009

(87) PCT Pub. No.: WO2008/105543
PCT Pub. Date: Sep. 4, 2008

(65) Prior Publication Data
US 2010/0097686 A1 Apr. 22, 2010

(30) Foreign Application Priority Data
Feb. 26, 2007 (JP) ................................. 2007-046266

(51) Int. Cl.
*G02B 26/00* (2006.01)
(52) U.S. Cl. ............ 359/296; 430/32; 430/38; 430/138; 345/107
(58) Field of Classification Search .................. 359/296; 430/32, 38, 138; 345/85, 107
See application file for complete search history.

(56) References Cited

U.S. PATENT DOCUMENTS

| | | |
|---|---|---|
| 6,177,921 B1 | 1/2001 | Comiskey et al. |
| 6,486,866 B1 | 11/2002 | Kuwahara et al. |

(Continued)

FOREIGN PATENT DOCUMENTS

JP  A 2000-137250  5/2000

(Continued)

*Primary Examiner* — Evelyn A. Lester
(74) *Attorney, Agent, or Firm* — Oliff & Berridge, PLC

(57) ABSTRACT

An electrophoretic sheet includes a substrate having one surface and the other surface, a microcapsule-containing layer comprised of a plurality of microcapsules, the microcapsule-containing layer provided on the other surface of the substrate, each of the plurality of microcapsules having a capsule body and an electrophoretic dispersion liquid contained in the capsule body, the electrophoretic dispersion liquid containing a plurality of electrophoretic particles of at least one color, and the capsule body having an inner circumferential surface and an outer circumferential surface, and at least one colored part provided on the external side of the inner circumferential surface of the capsule body of each of the plurality of microcapsules, and wherein each colored part has a color complementary to the color of the plurality of electrophoretic particles. By using the electrophoretic sheet mentioned above, it is possible to provide the increased whiteness in display of the electrophoretic particles. An electrophoresis apparatus provided with such an electrophoretic sheet is also provided. By using the electrophoresis apparatus, it is possible to provide a superior contrast ratio. It is also possible to obtain high reliability. A Method for manufacturing such an electrophoresis apparatus is also provided. An electronic device provided with such an electrophoresis apparatus is also provided.

19 Claims, 11 Drawing Sheets

U.S. PATENT DOCUMENTS

| | | |
|---|---|---|
| 6,798,470 B2 | 9/2004 | Iwanaga et al. |
| 7,576,903 B2 * | 8/2009 | Yamamoto et al. ........... 359/296 |
| 2004/0239613 A1 | 12/2004 | Kishi |
| 2005/0007649 A1 * | 1/2005 | Kawai et al. ................... 359/296 |
| 2006/0132895 A1 * | 6/2006 | Miyazaki ....................... 359/296 |
| 2006/0256423 A1 * | 11/2006 | Yamamoto et al. ........... 359/296 |
| 2007/0024953 A1 * | 2/2007 | Kanbe ............................ 359/296 |

FOREIGN PATENT DOCUMENTS

| | | |
|---|---|---|
| JP | A 2002-511607 | 4/2002 |
| JP | A 2002-277906 | 9/2002 |
| JP | A 2004-264411 | 9/2004 |
| JP | A 2004-271610 | 9/2004 |
| JP | A 2005-84267 | 3/2005 |
| JP | A 2006-28306 | 2/2006 |

* cited by examiner

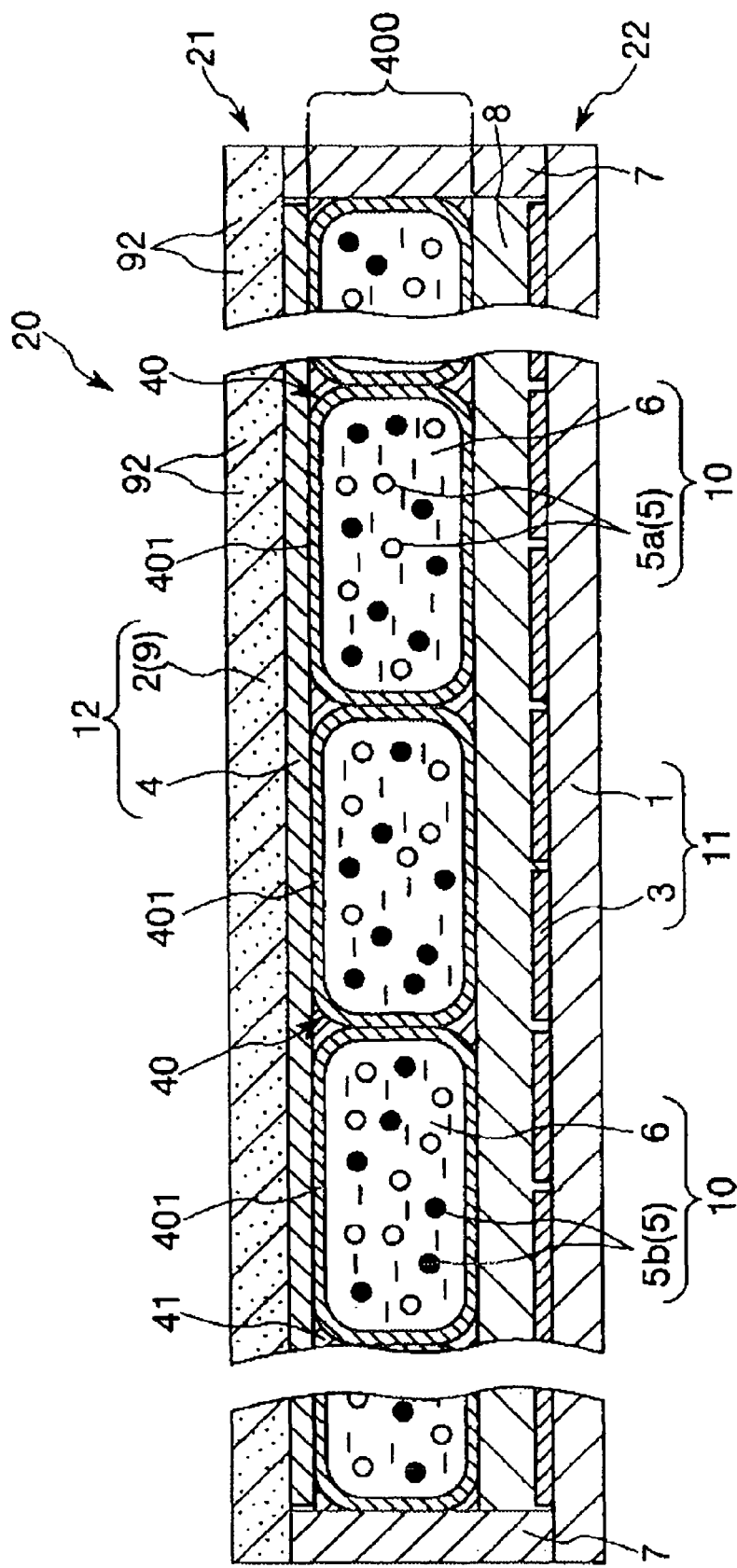

ELECTROPHORETIC SHEET, ELECTROPHORESIS APPARATUS, METHOD FOR MANUFACTURING AN ELECTROPHORESIS APPARATUS AND ELECTRONIC DEVICE

CROSS-REFERENCE TO RELATED APPLICATION

This application claims a priority to Japanese Patent Application No. 2007-046266 filed on Feb. 26, 2007 which is hereby expressly incorporated by reference herein in its entirety.

BACKGROUND

1. Technical Field

The present invention relates to an electrophoretic sheet, an electrophoresis apparatus, a method for manufacturing an electrophoresis apparatus and an electronic device.

2. Related Art

It is generally known that, if electric fields are allowed to act on a dispersion system in which fine particles are dispersed in liquid, the fine particles move (or migrate) through the liquid under the influence of a coulomb force. This phenomenon is referred to as electrophoresis. In recent years, an electrophoresis apparatus that displays desired information (images) using the electrophoresis draws attention as a new display apparatus.

The electrophoresis apparatus is characterized by exhibiting display memory characteristics even at the time of stoppage of voltage application, possessing a broad viewing angle and having a capability to perform high contrast display with reduced electricity consumption.

The electrophoresis apparatus is a reflection type display that uses natural light as a light source. In the electrophoresis apparatus, titania particles are often used as white particles. Polyethylene terephthalate as a conductive transparent resin (hereinafter simply referred to as "PET") on which indium tin oxide (hereinafter simply referred to as "ITO") is vapor-deposited is often used to a substrate provided on a display surface side of the electrophoresis apparatus.

As the electrophoresis apparatus noted above, there is known a microcapsule type electrophoresis apparatus that includes a pair of substrates each having an electrode, a plurality of microcapsules arranged between the substrates and filled with electrophoretic particles and a liquid-phase dispersion medium, and a binder arranged between the substrates for binding the respective substrates and the microcapsules together.

JP-A-2005-84267 discloses an electrophoresis apparatus manufactured by supplying microcapsule dispersion liquid, which contains a plurality of microcapsules, a binder and a dispersion medium, to one of substrates and then supplying the microcapsule dispersion liquid once again to fill gaps between the microcapsules.

Meanwhile, a high reflectance of a white color and whiteness, i.e., a capability of reflecting light over an entire visible light region, are sought in the electrophoresis apparatus. However, a contrast of the conventional electrophoresis apparatus is not so great but merely about six. Furthermore, a reflectance of a white color is not greater than 35%, meaning that the white color is gray in a practical sense. For this reason, a color is not really acknowledged as a problem in the prior art.

Since a PET-ITO substrate generally used in a electrophoresis apparatus reduces light transmittance on the low wavelength side of a visible light region, it is sometimes a case that white particles look yellow-reddish.

In addition, it is sometimes a case that titanium oxide (titania) used as white particles becomes yellowish over time or has a yellowish color intrinsically. For this reason, the combined use of a PET-ITO substrate and titanium oxide as white particles in producing an electrophoresis apparatus reduces whiteness in display, which entails a problem of reducing a white and black contrast and a sharpness of an image.

SUMMARY

It is an object of the present invention to provide an electrophoretic sheet capable of increasing whiteness in display of electrophoretic particles and constructing an electrophoresis apparatus with a superior contrast ratio, a highly reliable electrophoresis apparatus, a method for manufacturing an electrophoresis apparatus capable of easily and reliably manufacturing the electrophoresis apparatus, and a highly reliable electronic device.

These objects are achieved by the present invention described below.

In a first aspect of the present invention, there is provided an electrophoretic sheet. The electrophoretic sheet comprises a substrate having one surface and the other surface, a microcapsule-containing layer comprised of a plurality of microcapsules, the microcapsule-containing layer provided on the other surface of the substrate, each of the plurality of microcapsules having a capsule body and an electrophoretic dispersion liquid contained in the capsule body, the electrophoretic dispersion liquid containing a plurality of electrophoretic particles of at least one color, and the capsule body having an inner circumferential surface and an outer circumferential surface, and at least one colored part provided on the external side of the inner circumferential surface of the capsule body of each of the plurality of microcapsules, and wherein each colored part has the color complementary to a color of the plurality of electrophoretic particles.

According to the electrophoresis sheet described above, it is possible to improve the whiteness in display of the electrophoretic particles of at least one color, thereby enabling a white and black contrast and a sharpness of an image to be improved.

In the electrophoretic sheet according to the present invention, it is preferred that each colored part is comprised of a transmission part which serves to transmit light having a wavelength of the color complementary to the color of the plurality of electrophoretic particles.

This also improves the whiteness of the electrophoretic particles, thereby enabling a white and black contrast and a sharpness of an image more to be improved.

In the electrophoretic sheet according to the present invention, it is preferred that the capsule body of each of the plurality of microcapsules serves as the transmission part.

With this structure, since light of the color of electrophoretic particles is counterbalanced by the complementary color in the capsule body, it is possible to improve the whiteness in display of the electrophoretic particles.

In the electrophoretic sheet according to the present invention, it is preferred that the transmission part is constituted from a cover layer which is formed on the outer circumferential surface of the capsule body of each of the plurality of microcapsules.

With this structure, since the cover layer is substantially formed with the microcapsule-containing layer, it is possible to display the whiteness of the electrophoretic particles uniformly.

In the electrophoretic sheet according to the present invention, it is preferred that the microcapsule-containing layer is comprised of the plurality of microcapsules and a binder having a function of keeping the plurality of microcapsules in the microcapsule-containing layer, wherein the binder serves as the transmission part.

With this structure, since the surfaces of the microcapsule-containing layer are substantially covered with the binder constituting the transmission part, it is possible to display the whiteness of the electrophoretic particles uniformly.

In the electrophoretic sheet according to the present invention, it is preferred that the substrate includes a base portion which forms the one surface of the substrate and a second electrode provided on the base portion, and wherein the base portion serves as the transmission part.

With this structure, even if light having a wavelength of a low wavelength side of a visible light region shows a reduction in a transmission ratio due to a constituent material of the base portion, since a part of light having the wavelength of the complementary color is reflected by the base portion, light having the wavelength of the color the electrophoretic particles reflected by the electrophoretic particles and transmitted through the base portion is counterbalanced by the light having the wavelength of the complementary color reflected by the base portion. As a result, it is possible to increase the whiteness in display of the electrophoretic particles.

In the electrophoretic sheet according to the present invention, it is preferred that transmittance of light having a wavelength in the range of 400 to 700 nm possessed by the transmission part is equal to or greater than 80%.

This allows the light having a low wavelength in a visible light region to transmit the transmission part, but a part of the light is reflected by the transmission part. Therefore, it is possible to counterbalance the light having the wavelength of the color of the electrophoretic particles reflected by the electrophoretic particles and transmitted through the transmission part due to the light reflected by the transmission part. This makes it possible to increase the whiteness in display of the electrophoretic particles.

In the electrophoretic sheet according to the present invention, it is preferred that the transmission part contains an organic material which absorbs light having a wavelength corresponding to the color of the plurality of electrophoretic particles.

This allows intensity of light having the wavelength of the color of the electrophoretic particles to decrease while intensity of light having a wavelength of the complementary color to the electrophoretic particles to increase reliably. Therefore it becomes possible to increase the whiteness in display of the electrophoretic particles.

In the electrophoretic sheet according to the present invention, it is preferred that the organic material is constituted of organic pigment.

This makes it possible to exhibit increased color stability and weather resistance. Therefore, it is possible to maintain the whiteness in display of the electrophoretic particles for a long period of time.

In a second aspect of the present invention, there is provided an electrophoretic sheet. The electrophoretic sheet comprises a substrate having one surface and the other surface, a microcapsule-containing layer comprised of a plurality of microcapsules, the microcapsule-containing layer provided on the other surface of the substrate, each of the plurality of microcapsules having a capsule body and an electrophoretic dispersion liquid contained in the capsule body, the electrophoretic dispersion liquid containing a plurality of electrophoretic particles of at least one color, and the capsule body having an inner circumferential surface and an outer circumferential surface, and a reflection part provided on the one surface of the substrate, and wherein the reflection part reflects light having a wavelength of the color complementary to a color of the plurality of electrophoretic particles.

According to the electrophoretic sheet described above, light having the wavelength of the complementary color to the color of the electrophoretic particles can be reflected on the reflection part. Therefore, it is possible to counterbalance the light having the wavelength of the complementary color and the light having the wavelength of the electrophoretic particles. As a result, it is possible to increase the whiteness in display of the electrophoretic particles.

In the electrophoretic sheet according to the present invention, it is preferred that the reflection part is formed from an optical film of which a thickness is in the range of 100 to 175 nm.

This makes it possible to reflect light having the wavelength of the complementary color to the color of the electrophoretic particles efficiently, thereby increasing the whiteness in display of the electrophoretic particles.

In the electrophoretic sheet according to the present invention, it is preferred that the plurality of electrophoretic particles includes electrophoretic particles which are constituted of titanium oxide.

With this structure, due to the color of titanium oxide, it is possible to improve a white and black contrast ratio.

In the electrophoretic sheet according to the present invention, it is preferred that the at least one color includes a white color and a black color, wherein the complementary color is a color complementary to a changed color of the white electrophoretic particles, and wherein the color change from the white color is changed by the elapse of time.

This makes it possible to improve a white and black contrast and a sharpness of an image more.

In the electrophoretic sheet according to the present invention, it is preferred that the changed color includes a yellow or yellowish color and the complementary color includes a blue color.

Since the blue color is a complementary color to a yellow or yellowish color, it is possible to increase the whiteness in display of the electrophoretic particles having a yellowish color.

In a third aspect of the present invention, there is provided an electrophoresis apparatus. The electrophoresis apparatus comprises a substrate having one surface and the other surface, the substrate including a second electrode which forms the other surface of the substrate, a microcapsule-containing layer comprised of a plurality of microcapsules, the microcapsule-containing layer provided on the other surface of the substrate, each of the plurality of microcapsules having a capsule body and an electrophoretic dispersion liquid contained in the capsule body, the electrophoretic dispersion liquid containing a plurality of electrophoretic particles of at least one color, and the capsule body having an inner circumferential surface and an outer circumferential surface, an opposing substrate provided on the side of the microcapsule-containing layer on which no substrate is provided, the opposing surface having one surface and the other surface, the opposing substrate including a plurality of first electrodes which forms the one surface of the opposing surface, and at least one colored part provided on the external side of the inner circumferential surface of the capsule body of each of the plurality of microcapsules, and wherein each colored part has a color complementary to the color of the plurality of electrophoretic particles.

According to the electrophoresis apparatus described above, it is possible to improve the whiteness in display of the electrophoretic particles, thereby enabling a white and black contrast ratio and a sharpness of an image to be improved.

In the electrophoresis apparatus according to the present invention, it is preferred that the electrophoresis apparatus further comprises an adhesive agent layer which bonds the one surface of the opposing substrate to the microcapsule-containing layer.

This makes it possible to bond the opposing substrate and the microcapsule-containing layer reliably. Therefore, it is possible to provide the electrophoresis apparatus having a specific level of quality stably.

In a fourth aspect of the present invention, there is provided a method for manufacturing an electrophoresis apparatus. The electrophoresis apparatus have a substrate, an opposing substrate, and a microcapsule-containing layer comprised of a plurality of microcapsules, each of the substrate and the opposing substrate having one surface and the other surface, the substrate including a second electrode which forms the other surface of the substrate, the opposing substrate including a plurality of first electrodes which forms the one surface of the opposing substrate, each of the microcapsules having a capsule body and an electrophoretic dispersion liquid contained in the capsule body, the electrophoretic dispersion liquid containing a plurality of electrophoretic particles. The method comprises forming a colored part having a color complementary to the color of the plurality of electrophoretic particles on the one surface of the substrate, forming the microcapsule-containing layer on the other surface of the substrate, forming an adhesive agent layer on the microcapsule-containing layer, and bonding the one surface of the opposing substrate on the adhesive agent layer.

According to the manufacturing method described above, it is possible to easily manufacture the electrophoresis apparatus having an improved whiteness in display of the electrophoretic particles and an improved white and black contrast ratio.

In a fifth aspect of the present invention, there is provided a method for manufacturing an electrophoresis apparatus. The electrophoresis apparatus have a substrate, an opposing substrate, and a microcapsule-containing layer comprised of a plurality of microcapsules, each of the substrate and the opposing substrate having one surface and the other surface, the substrate including a second electrode which forms the other surface of the substrate, the opposing substrate including a plurality of first electrodes which forms the one surface of the opposing substrate, each of the microcapsules having a capsule body and an electrophoretic dispersion liquid contained in the capsule body, the electrophoretic dispersion liquid containing a plurality of electrophoretic particles of at least one color. The method comprises forming a reflection part reflecting light having a wavelength of a color complementary to the color of the plurality of electrophoretic particles on the one surface of the substrate, forming the microcapsule-containing layer on the other surface of the substrate, forming an adhesive agent layer on the microcapsule-containing layer, and bonding the one surface of the opposing substrate on the adhesive agent layer.

According to the manufacturing method described above, it is possible to easily manufacture the electrophoresis apparatus having an improved whiteness in display of the electrophoretic particles and an improved white and black contrast ratio.

In a sixth aspect of the present invention, there is provided an electronic device. The electronic device is provided with the electrophoresis apparatus described above.

According to the electronic device described above, it is possible to obtain electronic device having high reliability.

BRIEF DESCRIPTION OF THE DRAWINGS

FIGS. 4E to 4G are pattern diagrams for explaining a method for manufacturing the electrophoresis apparatus shown in FIG. 1, wherein FIG. 4E is continued from FIG. 3D.

FIG. 5 is a pattern diagram showing a vertical section of a second embodiment of the electrophoresis apparatus according to the present invention.

DESCRIPTION OF EXEMPLARY EMBODIMENTS

Hereinafter, an electrophoretic sheet, an electrophoresis apparatus, a method for manufacturing an electrophoresis apparatus and an electronic device in accordance with the present invention will be described in detail with reference to preferred embodiments shown in the accompanying drawings.

In the present invention, the term "colored part" refers to a part having at least one of functions of selectively transmitting or reflecting light having the same wavelength as that of a color complementary to a color of electrophoretic particles.

It is preferred that, in an electrophoresis display apparatus, the colored part may be provided on the side on which the colored part is more easily visible than electrophoretic dispersion liquid, i.e., on the external side of an inner circumference of microcapsules.

More specifically, the colored part is provided, e.g., 1) in a capsule body of each microcapsule (the fourth embodiment described later), 2) in contact with the capsule body (the third and fifth embodiments described later), or 3) out of contact with the capsule body (the first, and second embodiments described later). In general, the colored part is provided in the respective regions in a form of a film. The film may be formed either continuously or intermittently.

First Embodiment

1 Electrophoresis Apparatus

First, description will be made on an electrophoresis apparatus (the present electrophoresis apparatus) to which an electrophoretic sheet of the present invention is applied.

Figure 1:
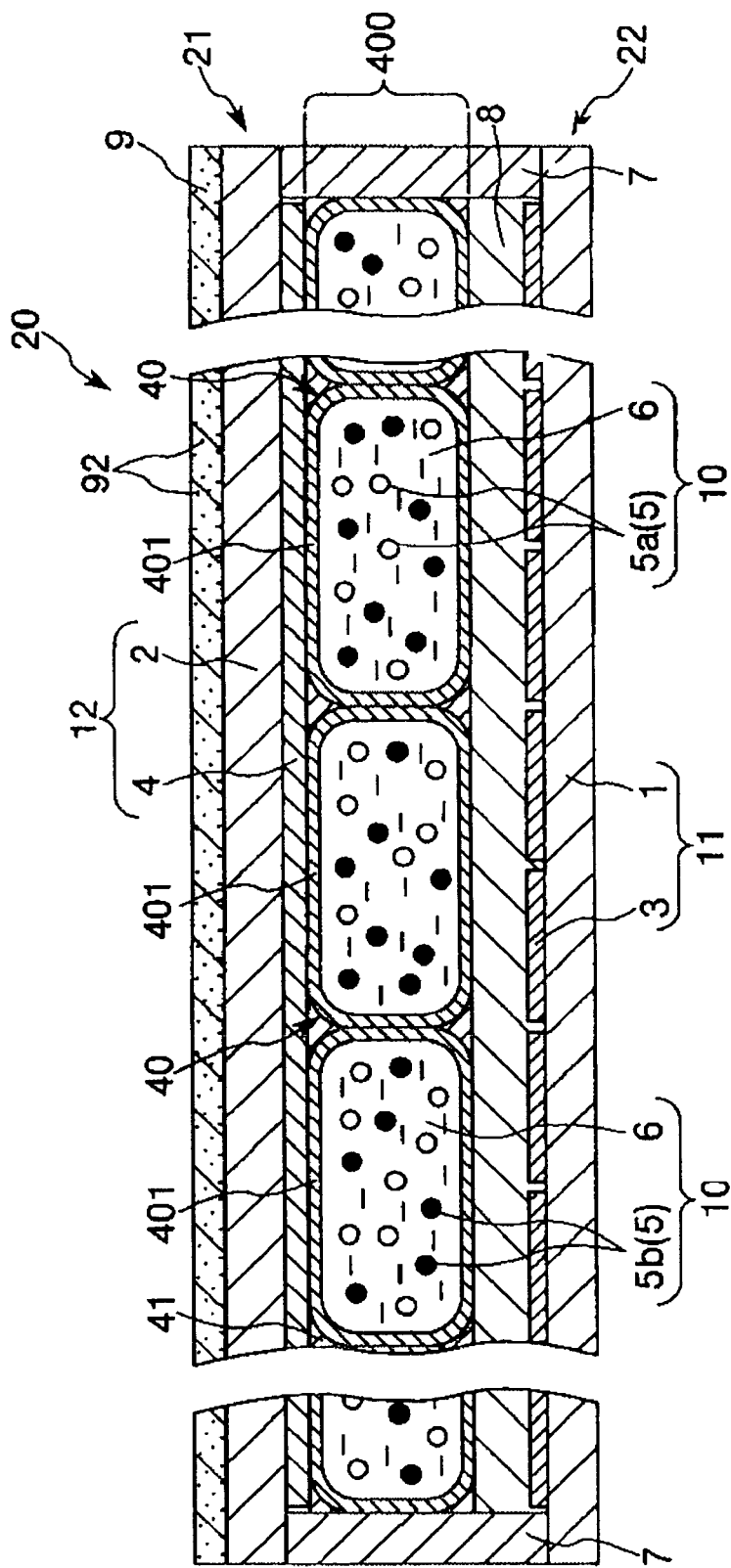
FIG. 1 is a pattern diagram showing a vertical section of a first embodiment of the electrophoresis apparatus according to the present invention.

FIG. 1 is a pattern diagram showing a vertical section of a first embodiment of the electrophoresis apparatus according to the present invention. Hereinafter, the upper side in FIG. 1 will be referred to as "upper" and the lower side will be referred to as "lower" for the purpose of convenience in description.

The electrophoresis apparatus 20 shown in FIG. 1 includes an electrophoretic sheet (front plane) 21, a circuit board (back plane) 22, an adhesive agent layer 8 for bonding the electrophoretic sheet 21 and the circuit board 22 together, and a sealing part 7 for air-tightly sealing a gap between the electrophoretic sheet 21 and the circuit board 22.

The electrophoretic sheet 21 includes a substrate 12, which has a plate-like base portion 2 and a second electrode 4 formed on the lower surface of the base portion 2, a microcapsule-containing layer 400 arranged on the lower surface (one surface) of the substrate 12 (second electrode 4) and comprised of a plurality of microcapsules 40 and a binder 41, and a colored part (a transmission part 9 in the present embodiment) arranged on the upper surface of the substrate 12.

On the other hand, the circuit board 22 includes an opposing substrate 11, which has a plate-like base portion 1 and a plurality of first electrodes 3 formed on the upper surface of the base portion 1, and circuits (not shown) provided in the opposing substrate 11 (the base portion 1), the circuits including switching elements such as TFTs and the like.

A construction of the respective parts will be now described one after another. Description on the transmission part 9 will be offered later.

The base portions 1 and 2 are formed from a sheet-like (plate-like) member and have a function of supporting or protecting the respective members arranged therebetween. Although the base portions 1 and 2 may be either flexible or rigid, it is preferred that the base portions 1 and 2 have flexibility. Use of the base portions 1 and 2 having flexibility makes it possible to provide a flexible electrophoresis apparatus, namely, an electrophoresis apparatus useful in constructing, e.g., an electronic paper.

In the case where the base portions 1 and 2 are flexible, examples of a constituent material thereof include: polyolefin such as polyethylene, polypropylene, ethylene-vinyl acetate copolymer, modified polyolefin or the like; liquid crystal polymer such as polyamide (e.g., nylon 6, nylon 46, nylon 66, nylon 610, nylon 612, nylon 11, nylon 12, nylon 6-12 and nylon 6-66), thermoplastic polyimide, aromatic polyester or the like; polyphenylene oxide; polyphenylene sulfide; polycarbonate; polymethylmethacrylate; polyether; polyether ether ketone; polyether imide; polyacetal; various kinds of thermoplastic elastomer such as styrene-based elastomer, polyolefin-based elastomer, polyvinyl chloride-based elastomer, polyurethane-based elastomer, polyester-based elastomer including polyethylene terephthalate (PET), polyamide-based elastomer, polybutadiene-based elastomer, transpolyisoprene-based elastomer, fluororubber-based elastomer, chlorinated polyethylene-based elastomer or the like; copolymer mainly constituted of the above materials; blends mainly constituted of the above materials; and polymer alloy mainly constituted of the above materials. One or more of these materials may be used independently or in combination.

An average thickness of each of the base portions 1 and 2 is not particularly limited but may be arbitrarily set depending on the constituent material and use thereof. In the case where the base portions 1 and 2 are flexible, the average thickness of each of the base portions 1 and 2 is preferably in the range of about 20 to 500 µm and more preferably in the range of about 25 to 250 µm. This makes it possible to reduce the size (especially, the thickness) of the electrophoresis apparatus 20, while harmonizing the flexibility and strength of the electrophoresis apparatus 20.

The first electrodes 3 and the second electrode 4 are of a layered shape (film shape) and are respectively formed on the surfaces of the base portions 1 and 2 on the sides of the microcapsule-containing layer 400. In other words, the first electrodes 3 are formed on the upper surface of the base portion 1 and the second electrode 4 is formed on the lower surface of the base portion 2. If a voltage is applied to between the first electrodes 3 and the second electrode 4, electric fields are generated across them so that the electric fields act on electrophoretic particles (display particles) 5.

In the present embodiment, the second electrode 4 serves as a common electrode and the first electrodes 3 function as individual electrodes divided in a form of a matrix (pixel electrodes connected to switching elements). A portion where the second electrode 4 is overlapped with one of the first electrodes 3 constitutes a unit pixel.

Just like the first electrodes 3, the second electrode 4 may be divided into a plurality of electrodes. Furthermore, the first electrodes 3 may be divided into a plurality of stripe-shaped electrodes and, similarly, the second electrode 4 may be divided into a plurality of stripe-shaped electrodes. In this case, the first electrodes 3 and the second electrode 4 may be arranged to intersect with each other.

A constituent material of each of the first electrodes 3 and the second electrode 4 is not particularly limited as long as it is substantially conductive. Various kinds of conductive material may be used as the constituent material of each of the first electrodes 3 and the second electrode 4.

Examples of such a conductive material include: a metallic material such as copper, aluminum, nickel, cobalt, platinum, gold, silver, molybdenum, tantalum or alloy containing these metals; a carbon-based material such as carbon black, carbon nanotube, fullerene or the like; an electronically conductive polymer material such as polyacetylene, polypyrrole, polythiophene, polyaniline, poly(p-phenylene), poly(p-phenylenevinylene), polyfluorene, polycarbazole, polysilane or derivatives thereof; an ion-conductive polymer material produced by dispersing ionic substances such as $NaCl$, $LiClO_4$, $KCl$, $H_2O$, $LiCl$, $LiBr$, $LiI$, $LiNO_3$, $LiSCN$, $LiCF_3SO_3$, $NaBr$, $NaI$, $NaSCN$, $NaClO_4$, $NaCF_3SO_3$, $KI$, $KSCN$, $KClO_4$, $KCF_3SO_3$, $NH_4I$, $NH_4SCN$, $NH_4ClO_4$, $NH_4CF_3SO_3$, $MgCl_2$, $MgBr_2$, $MgI_2$, $Mg(NO_3)_2$, $MgSCN_2$, $Mg(CF_3SO_3)_2$, $ZnCl_2$, $ZnI_2$, $ZnSCN_2$, $Zn(ClO_4)_2$, $Zn(CF_3SO_3)_2$, $CuCl_2$, $CuI_2$, $CuSCN_2$, $Cu(ClO_4)_2$, $Cu(CF_3SO_3)_2$ or the like in a matrix resin such as polyvinyl alcohol, polycarbonate, polyethylene oxide, polyvinyl butyral, polyvinyl carbazole, vinyl acetate or the like; and a conductive oxide material such as indium tin oxide (ITO), fluorine-doped tin oxide (FTO), tin oxide ($SnO_2$), indium oxide (IO) or the like. One or more of these materials may be used independently or in combination.

Other examples of the constituent material of each of the first electrodes 3 and the second electrode 4 include various kinds of composite material produced by mixing a nonconductive material such as a glass material, a rubber material, a polymer material or the like with a conductive material (conductive particles) such as gold, silver, nickel, carbon or the like so that the nonconductive material can become conductive.

Examples of the composite material include: a conductive rubber produced by mixing the conductive material with rubber material; a conductive adhesive agent or a conductive paste produced by mixing the conductive material with epoxy-based, urethane-based, acryl-based or other adhesive agent composition; and a conductive resin produced by mixing the conductive material with a matrix resin such as polyolefin, polyvinyl chloride, polystyrene, ABS resin, nylon (polyamide), ethylene-vinyl acetate copolymer, polyester, acrylic resin, epoxy-based resin, urethane-based resin or the like.

An average thickness of each of the first electrodes 3 and the second electrode 4 is not particularly limited but may be arbitrarily set depending on the constituent material and use thereof. The average thickness of each of the first electrodes 3 and the second electrode 4 is preferably in the range of about 0.05 to 10 µm and more preferably in the range of about 0.05 to 5 µm.

Among the base portions 1 and 2 and the first electrodes 3 and the second electrode 4, the ones arranged on a display surface side (the base portion 2 and the second electrode 4 in the present embodiment) are optically transparent, i.e., substantially transparent (clear and colorless, clear and colorful, or translucent). This makes it possible to easily recognize, through visual observation, the status of the electrophoretic particles 5 in the electrophoretic dispersion liquid 10 described below, i.e., information (images) displayed by the electrophoresis apparatus 20.

The first electrodes 3 and the second electrode 4 may be either a monolayer structure composed of one member of the materials as described above or a multilayer laminated structure formed by, e.g., laminating a plurality of materials one atop another. For example, the first electrodes 3 and the second electrode 4 may be either a monolayer structure composed of ITO or a dual layer laminated structure having an ITO layer and a polyaniline layer.

In the electrophoretic sheet 21, the microcapsule-containing layer 400 is provided in contact with the lower surface of the second electrode 4. The microcapsule-containing layer 400 includes a plurality of microcapsules 40 and a binder for fixing (or holding) the microcapsules 40 in position, each of the microcapsules 40 having a capsule body 401 filled with the electrophoretic dispersion liquid 10.

The microcapsules 40 are arranged between the opposing substrate 11 and the substrate 12 in a single layer so that each of the microcapsules 40 can be placed side by side in lengthwise and crosswise directions (one by one without overlapping in their thickness direction).

In the present embodiment, the microcapsules 40 are sandwiched between the second electrode 4 and the adhesive agent layer 8 in such a way that the microcapsules 40 can be compressed in a vertical direction of the electrophoresis apparatus 20 and expanded in a horizontal direction of the electrophoresis apparatus 20 to have a flat shape. In other words, the microcapsules 40 have a stone-wall structure when seen in a plan view.

This structure allows the electrophoresis apparatus 20 to have an increased effective display region and an improved contrast ratio. Furthermore, it becomes possible to shorten a vertical moving distance of the electrophoretic particles 5. This makes it possible for the electrophoretic particles 5 to be moved and to be gathered in the vicinity of specified electrodes (first electrodes 3 and second electrode 4) in the microcapsules 40 within a short period of time, thereby increasing a response speed.

In the present embodiment, the microcapsules 40 are arranged so that one microcapsule 40 can correspond to two neighboring first electrodes 3. In other words, each of the microcapsules 40 extends over two neighboring first electrodes 3.

Examples of a constituent material of the capsule body 401 include: gelatin; a composite material composed of gum arabic and gelatin; and various kinds of resin material such as urethane-based resin, melamine-based resin, urea-formaldehyde resin, polyamide, polyether or the like. One or more of these materials may be used independently or in combination.

It is preferred that the capsule body 401 is mainly constituted of a gelatin-containing material (particularly, gelatin). This makes it possible to increase the flexibility of the microcapsules 40 and to reliably form the stone-wall structure described above. As will be described later, gelatin exhibits increased affinity with (metha)acrylic acid ester which is preferably used as the binder 41. Therefore, the use of gelatin is preferred in that fixing force (holding force) of the microcapsules 40 provided by the binder 41 can be further increased through the use of gelatin.

Examples of the gelatin include: untreated gelatin; lime-treated gelatin; oxidation-treated gelatin; decalcified gelatin with reduced calcium content; and oxidation-treated gelatin having reduced methionine residues. One or more of them may be used independently or in combination.

The constituent material of the capsule body 401 may be cross-linked (three-dimensional cross-linked) by means of a cross-linking agent. This makes it possible to increase strength of the capsule body 401 while maintaining flexibility thereof. As a result, it is possible to prevent the microcapsules 40 from being broken with ease.

It is preferred that the microcapsules 40 have a generally uniform size. This allows the electrophoresis apparatus 20 to exhibit superior display performance while avoiding or reducing occurrence of variations in display.

The electrophoretic dispersion liquid 10 encapsulated within the capsule body 401 is produced by dispersing (or suspending) at least one kind of electrophoretic particles 5 (two kinds of electrophoretic particles 5, i.e., colored particles 5b and white particles 5a, in the present embodiment) in a liquid-phase dispersion medium 6.

A task of dispersing the electrophoretic particles 5 in the liquid-phase dispersion medium 6 can be performed by using one or more of, e.g., a paint shaker method, a ball mill method, a media mill method, an ultrasonic dispersion method and a stirrer dispersion method.

A dispersion medium that exhibits low solubility to the capsule body 401 and has relatively high insulation performance is preferably used as the liquid-phase dispersion medium 6.

Examples of the liquid-phase dispersion medium 6 include: various kinds of water (e.g., distilled water, deionized water, ion-exchanged water and RO water); alcohol such as methanol, ethanol, isopropanol, butanol, octanol, ethylene glycol, diethylene glycol, glycerin and the like; cellosolve such as methyl cellosolve, ethyl cellosolve, phenyl cellosolve and the like; ester such as methyl acetate, ethyl acetate, butyl acetate, ethyl formate and the like; ketone such as acetone, methyl ethyl ketone, diethyl ketone, methyl isobutyl ketone, methyl isopropyl ketone, cyclohexanone and the like; aliphatic hydrocarbon (liquid paraffin) such as pentane, hexane, octane and the like; alicyclic hydrocarbon such as cyclohexane, methyl cyclohexane and the like; aromatic hydrocarbon including benzene with a long-chain alkyl group, such as benzene, toluene, xylene, hexyl benzene, heptyl benzene, octyl benzene, nonyl benzene, decyl benzene, undecyl benzene, dodecyl benzene, tridecyl benzene, tetradecyl benzene and the like; halogenated hydrocarbon such as methylene chloride, chloroform, carbon tetrachloride, 1,2-dichloroethane and the like; aromatic heterocycle such as pyridine, pyrazine, furan, pyrrole, thiophene, methyl pyrolidone and the like; nitrile such as acetonitrile, propionitrile, acrylonitrile and the like; amide such as N,N-dimethylformamide, N,N-dimethylacetamide and the like; carboxylic salt; and various kinds of oil. One or more of them may be used independently or in combination.

It is preferred that the liquid-phase dispersion medium 6 is mainly constituted of the aliphatic hydrocarbon (liquid paraffin). The use of the liquid paraffin is preferred because liquid paraffin has a greater effect in preventing the electrophoretic particles 5 from clumping together and exhibits reduced affinity with (reduced solubility to) the constituent material of the capsule body 401. This makes it possible to reliably prevent or reduce the over-time degradation in display performance of the electrophoresis apparatus 20. Furthermore, liquid paraffin does not have unsaturated bonds and therefore the use of the liquid paraffin is also preferred in terms of increased weather resistance and improved safety.

Among the aliphatic hydrocarbon (liquid paraffin), it is particularly preferred to use a branched aliphatic hydrocarbon (isoparaffin). The use of the isoparaffin is preferred because it is highly effective in preventing the electrophoretic particles 5 from clumping together.

A carbon number of isoparaffin is preferably in the range of 5 to 15 and more preferably in the range of 8 to 15. If the isoparaffin whose the carbon number falls within the above-noted range is used as the liquid-phase dispersion medium 6, it is possible to prevent any unnecessary increase in the viscosity of the liquid-phase dispersion medium 6 (electrophoretic dispersion liquid 10).

Also possible is to make the specific gravity of the electrophoretic particles 5 smaller than that of the liquid-phase dispersion medium 6. As a result, it is possible to sufficiently reduce the sinking velocity of the electrophoretic particles 5. This assists in increasing the display performance (especially, the response speed and the retention characteristics) of the electrophoresis apparatus 20.

In this regard, it is to be noted that one kind of isoparaffin may be used independently or two or more kinds of isoparaffin may be used in combination.

If necessary, various kinds of an additive may be added to the liquid-phase dispersion medium 6 (electrophoretic dispersion liquid 10). Examples of such an additive include: a charge-controlling agent formed of particles of an electrolyte, a (anionic or cationic) surfactant, a metal soap, a resin material, a rubber material, a oil, a varnishe, compounds and the like; a dispersion agent such as a titanium-based coupling agent, an aluminum-based coupling agent, a silane-based coupling agent and the like; a lubricating agent; and a stabilizing agent.

Examples of such a surfactant include alkenyl succinate ester, alkenyl succinate polyimide, and the like.

The electrophoretic particles 5 may be of any type as long as they are charged and can be electrophoretically moved in the liquid-phase dispersion medium 6 under the action of electric fields. Although there is no particular limitation, at least one of pigment particles, resin particles and composite particles thereof may be preferably used as the electrophoretic particles 5. These kinds of particles provide advantages in that they can be manufactured with ease and can perform a charge-controlling task in a relatively easy manner.

Examples of a pigment of which the pigment particles are made include: a black pigment such as aniline black, carbon black, titanium black, and the like; a white pigment such as titanium oxide, antimony oxide, barium sulfate, zinc sulfide, zinc oxide, silicon oxide, aluminum oxide and the like; an azo-based pigment such as monoazo, disazo, polyazo and the like; a yellow pigment such as isoindolinone, chrome yellow, yellow iron oxide, cadmium yellow, titanium yellow, antimony and the like; a red pigment such as quinacridone red, chrome vermilion and the like; a blue pigment such as phthalocyanine blue, indanthrene blue, iron blue, ultramarine blue, cobalt blue and the like; and a green pigment such as phthalocyanine green and the like. One or more of these pigments may be used independently or in combination.

Examples of a resin material of which the resin particles are made include an acrylic resin, an urethane-based resin, an urea-based resin, an epoxy-based resin, polystyrene, polyester and the like. One or more of these resin materials may be used independently or in combination.

Examples of the composite particles include: particles produced by coating the surfaces of the pigment particles with the resin material or other pigment; particles produced by coating the surfaces of the resin particles with the pigment; and particles made of a mixture obtained by mixing the pigment and the resin material in a suitable composition ratio.

Examples of the particles produced by coating the surfaces of the pigment particles with other pigment include particles obtained by coating the surfaces of titanium oxide particles with silicon oxide or aluminum oxide. These particles are preferably used as the white particles 5a.

Carbon black particles or particles produced by coating the surfaces the carbon black particles are preferably used as colored particles (black particles) 5b.

A shape of the electrophoretic particles 5 may preferably be, but is not particularly limited to, a spherical shape. An average particle diameter of the electrophoretic particles 5 is preferably in the range of about 10 to 500 nm and more preferably in the range of about 20 to 300 nm.

If the average particle diameter of the electrophoretic particles 5 falls within the above-noted range, the electrophoretic particles 5 have a suitable size. Therefore, it is possible to reliably prevent the electrophoretic particles 5 from clumping together or sinking in the liquid-phase dispersion medium 6. As a result, it becomes possible to prevent degradation in the display quality of the electrophoresis apparatus 20.

In the case where two different particles of different colors are used as in the present embodiment, it is preferred that they have different average particle diameters. It is particularly preferred that the average particle diameter of the white particles 5a is set greater than that of the colored particles 5b. This makes it possible to increase the display contrast and retention characteristics of the electrophoresis apparatus 20.

More specifically, it is preferred that the colored particles 5b have an average particle diameter in the range of about 20 to 100 nm and the white particles 5a have an average particle diameter in the range of about 150 to 300 nm.

It is also preferred that a specific gravity of the electrophoretic particles 5 is set almost equal to that of the liquid-phase dispersion medium 6. This ensures that the electrophoretic particles 5 can stay in specified positions within the liquid-phase dispersion medium 6 for a prolonged period of time, even after a voltage application to between the first electrodes 3 and the second electrode 4 is stopped. That is to say, information displayed on the electrophoresis apparatus 20 is visibly retained for an extended period of time.

The binder 41 is provided between the opposing substrate 11 and the substrate 12 for the purpose of, e.g., bonding the opposing substrate 11 and the substrate 12 together, fixing the opposing substrate 11, the substrate 12 and the microcapsules 40, and assuring insulation between the first electrodes 3 and the second electrode 4. This makes it possible to increase durability and reliability of the electrophoresis apparatus 20.

Preferably used as the binder 41 is a resin material that exhibits high affinity with (improved adhesion to) the respective electrodes 3 and 4 and the capsule bodies 401 (of the microcapsules 40) and shows increased insulation performance.

Examples of such a resin material used as the binder 41 include: a thermoplastic resin such as polyethylene, chlorinated polyethylene, ethylene-vinyl acetate copolymer, ethylene-ethyl acrylate copolymer, polypropylene, AS resin, ABS resin, methyl methacrylate resin, vinyl chloride resin, vinyl chloride-vinyl acetate copolymer, vinyl chloride-vinylidene chloride copolymer, vinyl chloride-acrylic acid ester copolymer, vinyl chloride-methacrylic acid copolymer, vinyl chloride-acrylonitrile copolymer, ethylene-vinyl alcohol-vinyl chloride copolymer, propylene-vinyl chloride copolymer, vinylidene chloride resin, vinyl acetate resin, polyvinyl alcohol, polyvinyl formal, cellulose-based resin and the like; a polymer such as polyamide-based resin, polyacetal, polycarbonate, polyethylene terephthalate, polybutylene terephthalate, polyphenylene oxide, polysulfone, polyamide imide, polyamino bismaleimide, polyether sulfone, polyphenylene sulfone, polyarylate, grafted polyphenylene ether, polyether ether ketone, polyether imide and the like; a fluorine-based resin such as polyethylene tetrafluoride, polyethylene propylene fluoride, ethylene tetrafluoride-perfluoroalkoxyethylene copolymer, ethylene-ethylene tetrafluoride copolymer, polyvinylidene fluoride, polyethylene trifluorochloride, fluororubber and the like; a silicone-based resin such as silicone resin, silicone rubber and the like; an urethane-based resin such as polyurethane and the like; and various kinds of other resin material such as methacrylic acid-styrene copolymer, polybutylene, methyl methacrylate-butadiene-styrene copolymer and the like. One or more of these materials may be used independently or in combination.

It is preferred that a dielectric constant of the binder 41 is set nearly equal to that of the liquid-phase dispersion medium 6. To this end, the binder 41 is preferably added with a dielectric constant regulating agent, examples of which include: alcohol such as 1,2-butanediol, 1,4-butanediol and the like; ketone; carboxylic salt; and the like.

In the present embodiment, the electrophoretic sheet 21 and the circuit board 22 are bonded together by means of the adhesive agent layer 8. This makes it possible to fix the electrophoretic sheet 21 and the circuit board 22 in a reliable manner.

In addition to the function of bonding (fixing) the electrophoretic sheet 21 and the circuit board 22 together, the adhesive agent layer 8 preferably has functions of: I) making insulation; II) preventing ions from diffusing from the electrophoretic sheet 21 to the circuit board 22; III) absorbing and retaining moisture infiltrated into the electrophoresis apparatus 20; and IV) relieving stresses generated in the process of bonding the electrophoretic sheet 21 and the circuit board 22 together.

Provision of the function I) makes it possible to reliably prevent occurrence of short circuit between the first electrodes 3 and the second electrode 4, thus allowing electric fields to surely act on the electrophoretic particles 5.

Provision of the function II) makes it possible to prevent or reduce a decline of characteristics of circuits (especially, switching elements) formed in the circuit board 22.

Provision of the function III) makes it possible to prevent or reduce diffusion of moisture to the microcapsules 40 or the circuits formed in the circuit board 22, even when the moisture is infiltrated into the electrophoresis apparatus 20. Thus, it becomes possible to prevent degradation of the microcapsules 40 or the circuits.

Provision of the function IV) makes it possible to prevent breakage of the microcapsules 40 or the switching elements (the circuit) formed in the circuit board 22, which would otherwise occur in the process of manufacturing the electrophoresis apparatus 20.

The adhesive agent layer 8 has preferably at least one, more preferably two or more and even more preferably all of the functions I) to IV). This makes it possible to further improve reliability and durability of the electrophoresis apparatus 20.

It is preferred that the adhesive agent layer 8 be mainly constituted of polyurethane (a constitute material). This is because polyurethane is capable of reliably imparting the functions as described above to the adhesive agent layer 8.

Polyurethane contains an isocyanate component and a polyol component. The isocyanate component may be, e.g., at least one of tetramethylxylene diisocyanate (TMXDI), hexamethylene diisocyanate (HMDI), hydrogenated diphenylmethane diisocyanate (12H-MDI) and derivatives thereof. The polyol component may be, e.g., at least one of polypropylene glycol (PPG), polytetramethylene glycol (PTMG), 1,6-hexanediol (HD), bis(hydroxymethyl)propionic acid (BHMPCA) and derivatives thereof.

Such a polyurethane may contain other components, e.g., ethoxylated dicyclopentenyl(metha)acrylate and the like. These components show increased adhesion to (metha) acrylic acid ester, thereby making it possible to improve adhesion between the binder 41 constituting of the (metha)acrylate and the adhesive agent layer 8.

In addition to polyurethane, examples of the constituent material of the adhesive agent layer 8 further include: a thermoplastic resin such as polyethylene, chlorinated polyethylene, ethylene-vinyl acetate copolymer, ethylene-ethyl acrylate copolymer, polypropylene, AS resin, ABS resin, methyl methacrylate resin, vinyl chloride resin, vinyl chloride-vinyl acetate copolymer, vinyl chloride-vinylidene chloride copolymer, vinyl chloride-acrylic acid ester copolymer, vinyl chloride-methacrylic acid copolymer, vinyl chloride-acrylonitrile copolymer, ethylene-vinyl alcohol-vinyl chloride copolymer, propylene-vinyl chloride copolymer, vinylidene chloride resin, vinyl acetate resin, polyvinyl alcohol, polyvinyl formal, cellulose-based resin and the like; a polymer such as polyamide-based resin, polyacetal, polycarbonate, polyethylene terephthalate, polybutylene terephthalate, polyphenylene oxide, polysulfone, polyamide imide, polyamino bismaleimide, polyether sulfone, polyphenylene sulfone, polyarylate, grafted polyphenylene ether, polyether ether ketone, polyether imide and the like; a fluorine-based resin such as polyethylene tetrafluoride, polyethylene propylene fluoride, ethylene tetrafluoride-perfluoroalkoxyethylene copolymer, ethylene-ethylene tetrafluoride copolymer, polyvinylidene fluoride, polyethylene trifluorochloride, fluororubber and the like; a silicone-based resin such as silicone resin, silicone rubber and the like; and various kinds of other resin material such as methacrylic acid-styrene copolymer, polybutylene, methyl methacrylate-butadiene-styrene copolymer and the like. One or more of these materials may be used independently or in combination.

Assuming that an average thickness of the adhesive agent layer 8 is A (μm) and an average thickness of the microcapsule-containing layer 400 is B (μm), a relation of A/B is preferably in the range of 0.1 to 3 and more preferably in the range of 0.5 to 2. By satisfying this relation, it is possible to improve the functions I) and IV) described above. In this regard, it is to be noted that the average thickness of the adhesive agent layer 8 is preferably in the range of about 1 to 30 μm and more preferably in the range of about 5 to 20 μm.

The sealing part 7 is provided between the base portions 1 and 2 and along the peripheral edges of the first electrodes 3, the second electrode 4, the microcapsule-containing layer 400, and the adhesive agent layer 8. The first electrodes 3, the second electrode 4, the microcapsule-containing layer 400 and the adhesive agent layer 8 are air-tightly sealed by means of the sealing part 7. This makes it possible to prevent moisture from infiltrating into the electrophoresis apparatus 20, thereby reliably avoiding degradation in display performance of the electrophoresis apparatus 20.

Various kinds of resin material can be used as a constituent material of the sealing part 7. Examples of such a constituent material of the sealing part 7 include: a thermoplastic resin such as acrylic resin, an urethane-based resin, an olefin-based resin and the like; and a thermosetting resin such as an epoxy-based resin, a melamine-based resin, a phenol-based resin and the like. One or more of these resin materials may be used independently or in combination. In this regard, it is to be noted that the sealing part 7 may be either provided or removed depending on the circumstances.

In the case that titanium oxide is used as the white particles 5a in the electrophoresis apparatus 20, it is sometimes the case that titanium oxide has a yellowish color intrinsically or becomes yellowish over time. This reduces the whiteness of titanium oxide in display during the operation of the electrophoresis apparatus 20, which in turn decreases a white and black contrast and a sharpness of an image.

In view of this, the electrophoresis apparatus 20 of the present embodiment includes a colored part which is provided on the external side of the inner circumferential surface of the capsule body 401 of each of the microcapsules 40 of the electrophoretic sheet 21 in an effort to increase the whiteness degree in display of a changed color of the white particles 5a. In other words, the electrophoresis apparatus 20 of the present embodiment includes a transmission part 9 provided on the upper surface of the substrate 12. The transmission part 9 may serve to transmit light having a wavelength of a color complementary to the changed color of the electrophoretic particles 5.

Description will now be made on the case where the white particles 5a have a yellowish color (yellowish white particles 5a).

The transmission part 9 functions as an optical filter for eliminating light having a wavelength of the yellowish color of the yellowish white particles 5a. The transmission part 9 is constituted of an organic material 92 that selectively absorbs light having a wavelength (in the range of 560 to 605 nm) corresponding to the color of the yellowish white particles 5a (yellow wavelength light) and a binder material. In other words, the organic material 92 refers to a material that selectively reflects light having a wavelength in the range of 400 to 490 nm (blue wavelength light).

Examples of such an organic material 92 include: a blue organic pigment such as methylene blue, brilliant blue-FCF, indigo carmine, indigo, phthalocyanine blue, induslene blue, C.I. pigment blue 15:3, C.I. pigment blue 15, iron blue, cobalt blue, alkali blue lake, victoria blue lake, metal-free phthalocyanine blue, partially chlorinated phthalocyanine blue, fast sky blue, induslene blue BC, partially sulfonated copper phthalocyanine and the like; and a blue polymer compound such as fluorene-carbazole copolymer, binaphthyl-fluorence copolymer and the like. Two or more of these materials may be used in combination. Among these materials, the blue organic pigment is preferred and the phthalocyanine blue is more preferred.

If the blue organic pigment and, more particularly, the phthalocyanine blue, is used as the organic material 92, the transmission part 9 exhibits increased color stability and weather resistance. Therefore, the transmission part 9 is capable of absorbing the yellow wavelength light having the wavelength in the range of 560 to 605 nm and reflecting or transmitting the blue wavelength light. The blue organic pigment and, more particularly, the phthalocyanine blue, exhibits superior wavelength characteristics with respect to the yellow wavelength light. Consequently, it is possible to counterbalance the yellow wavelength light, thereby increasing the whiteness in display of the yellowish white particles 5a.

A content of the organic material 92 contained in the transmission part 9 is preferably in the range of 0.01 to 10 μmol/g and more preferably in the range of 0.1 to 1 mmol/g. This ensures that the organic material 92 is contained in the transmission part 9 in a just enough quantity. Therefore, it is possible to reliably increase the whiteness in display of the yellowish white particles 5a without increasing or decreasing intensity of the light (blue wavelength light) having the wavelength corresponding to the color of the organic material 92.

If the content of the organic material 92 is smaller than the lower limit value of the above-noted range, there is a possibility that the organic material 92 becomes incapable of sufficiently absorbing the yellow wavelength light.

In contrast, if the content of the organic material 92 is greater than the upper limit value of the above-noted range, it is sometimes the case that the blue wavelength light grows intensive and display in the electrophoresis apparatus 20 is seen like blue ones.

The same materials as those of the binder 41 can be used as a binder material of the transmission part 9.

A thickness of the transmission part 9 is preferably in the range of 10 to 1000 nm and more preferably in the range of 50 to 500 nm. The transmission part 9 may be formed from a multilayer lamination film. In this case, the thickness of the multilayer lamination film may be controlled to fall within the above-noted range when the transmission part 9 is formed by laminating the respective layers.

A transmittance of light having a wavelength in the range of 400 to 700 nm possessed by the transmission part 9 is preferably equal to or greater than 80% and more preferably equal to or greater than 85%.

This allows the light having the wavelength in the range of 400 to 700 nm in a visible light region (including the light having a low wavelength such as the blue wavelength light) to transmit the transmission part 9 in a high transmission ratio, but a part of the blue wavelength light is reflected by the transmission part 9. Therefore, it is possible to counterbalance the yellow wavelength light reflected by the yellowish white particles 5a and transmitted through the transmission part 9 due to the blue wavelength light reflected by the transmission part 9. This makes it possible to increase the whiteness in display of the yellowish white particles 5a. As a result, it is possible to increase a contrast of an image displayed and sharpen the image.

Inasmuch as the light having the wavelength in the range of 400 to 700 nm can transmit the transmission part 9 in a high transmission ratio, it is possible to realize color display in the electrophoresis apparatus 20 that makes use of a color filter.

If the transmittance of the light having the wavelength in the range of 400 to 700 nm is smaller than the above-noted value, the light having the wavelength in the range of 400 to 700 nm can not reach the yellowish white particles 5a sufficiently, thereby reducing the light to be reflected by the yellowish white particles 5a. As a result, there is a fear that it is impossible to visually recognize the color of the yellowish white particles 5a accurately.

In the transmission part 9, the difference between the maximum and minimum values of the transmittance of the light having the wavelength in the range of 400 to 700 nm is preferably within 8% and more preferably within 5%. This ensures that the lights of different wavelengths have a generally equal transmission ratio. In other words, the transmission ratio of the blue wavelength light transmitted through the transmission part 9 becomes generally equal to the transmission light of the yellowish wavelength light transmitted through the transmission part 9. But as described above, since a part of the blue wavelength light is reflected on the transmission part 9, it is possible to counterbalance the yellow wavelength light reflected by the yellowish white particles 5a and transmitted through the transmission part 9 due to the blue wavelength light reflected by the transmission part 9. This makes it possible to increase the whiteness in display of the yellowish white particles 5a.

If the difference between the maximum and minimum values of the transmittance of the light is greater than the above-noted value, the lights of different wavelengths show a non-uniform transmission ratio, which may possibly make the whiteness in display of the yellowish white particles 5a non-uniform.

In this regard, it is to be noted that it is preferred that both the transmittance of the light having the wavelength in the range of 400 to 700 nm and the difference between the maximum and minimum values of the transmittance of the light satisfy the above-noted values, although there is no problem if one of them meets with the above-noted values. This allows the transmission part 9 to transmit the light having the wavelength in the range of 400 to 700 nm in a high transmission ratio and with increased equal.

As a result, it is possible to further increase the whiteness in display of the yellowish white particles 5a. The transmission part 9 of the present invention is constituted as set forth above.

In this regard, it is to be noted that an organic material of optimum color may be arbitrarily selected as the organic material 92 according to the changed color of the white particles 5a. For example, if the white particles 5a are reddish, it may be possible to use an organic material that reflects or transmits green wavelength light.

In contrast, if the white particles 5a are greenish, it may be possible to use an organic material that reflects or transmits red wavelength light. In addition, if the white particles 5a are bluish, it may be possible to use an organic material that reflects or transmits yellow wavelength light.

Examples of such an organic material 92 includes: a green organic pigment such as phthalocyanine green, pigment green B and the like; a red organic pigment such as permanent red 4R, benzine orange, pyrazolone red, lake red D, watching red, brilliant carmine 6B, rhodamine lake B and the like; and a yellow organic pigment such as naphthol yellow S, hansa yellow G, hansa yellow 10G, benzidine yellow G, benzidine yellow GR, quinoline yellow lake and the like. Two or more of these materials may be used in combination.

2 Operating Method of Electrophoresis Apparatus

Such an electrophoresis apparatus 20 is operated as follows. Description will now be made regarding an operating method of the electrophoresis apparatus 20.

Figure 2A:
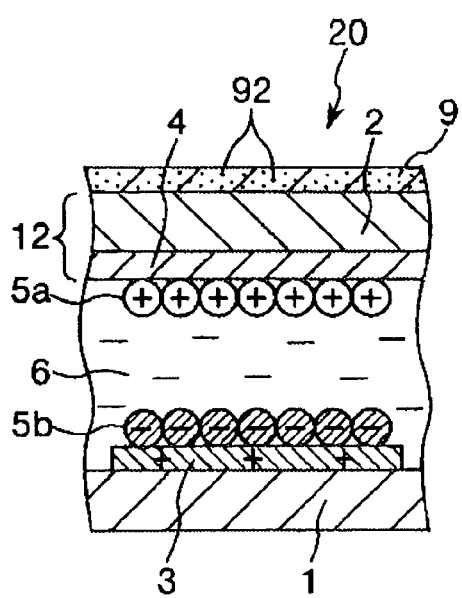
FIG. 2A and FIG. 2B are pattern diagrams for explaining an operating method of the electrophoresis apparatus shown in FIG. 1.
Figure 2B:
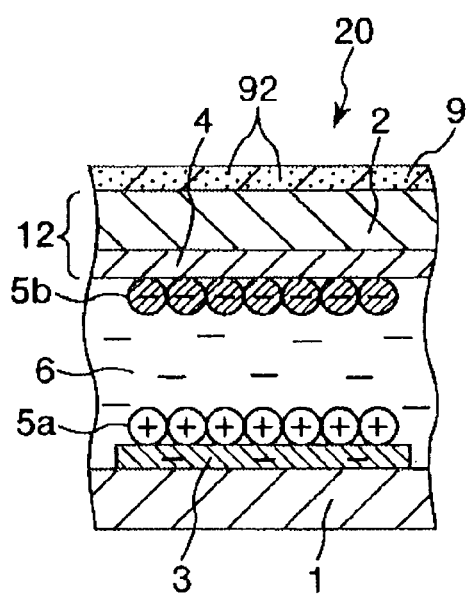

FIGS. 2A and 2B are pattern diagrams for explaining an operating method of the electrophoresis apparatus shown in FIG. 1. Hereinafter, the upper side in these figures will be referred to as "top" and the lower side will be referred to as "lower".

Upon applying a voltage to between the first electrodes 3 and the second electrode 4 of the electrophoresis apparatus 20, electric fields are generated across them. The electric fields allow the electrophoretic particles 5 (the colored particles 5b and the yellowish white particles 5a) to electrophoretically move toward the respective electrodes.

For example, if positively charged particles are used as the yellowish white particles 5a and negatively charged particles are used as the colored particles (black particles) 5b, and if the first electrodes 3 are kept in a positive electric potential as illustrated in FIG. 2A, the yellowish white particles 5a are moved toward and gathered on the second electrode 4.

On the other hand, the colored particles 5b are moved toward and gathered on the first electrodes 3. Therefore, when observing the electrophoresis apparatus 20 from the top thereof (namely, the display surface side), the color of the yellowish white particles 5a, i.e., a yellowish white color, is seen.

In case of an electrophoresis apparatus having no transmission part, yellow wavelength light (having the wavelength in the range of 560 to 605 nm) among light incident to the yellowish white particles 5a is reflected by the yellowish white particles 5a and transmitted through the substrate 12. For this reason, the yellowish white particles 5a are seen yellowish.

Owing to the fact that the transmission part 9 is provided on the substrate 12 in the electrophoresis apparatus 20 of the present invention, the yellow wavelength light reflected by the yellowish white particles 5a and transmitted through the substrate 12 is absorbed by a constituent material (organic material 92) of the transmission part 9, thus undergoing reduction in its intensity.

At the same time, a part of the blue wavelength light (having the wavelength in the range of 400 to 490 nm) among the light incident to the transmission part 9 from the outside of the electrophoresis apparatus 20 is reflected by the organic material 92 contained in the transmission part 9. Thus, the blue wavelength light shows an increase in its intensity.

Along with the decrease in the intensity of the yellow wavelength light and the increase in the intensity of the blue wavelength light, the yellowish white color is counterbalanced to thereby increase the whiteness of the yellowish white particles 5a.

In contrast, if the first electrodes 3 are kept in a negative electric potential as illustrated in FIG. 2B, the yellowish white particles 5a are moved toward and gathered on the first electrodes 3. On the other hand, the colored particles 5b are moved toward and gathered on the second electrode 4. Therefore, when observing the electrophoresis apparatus 20 from the top thereof (namely, the display surface side), the color of the colored particles 5b, i.e., a black color, is seen.

If an electrifying amount of the electrophoretic particles 5 (the yellowish white particles 5a and the colored particles 5b), a polarity of the first electrodes 3 and the second electrode 4, a potential difference between the first electrodes 3 and the second electrode 4 and the like are suitably set in the configuration set forth above, desired information (an image) is displayed on the display surface of the electrophoresis apparatus 20 according to the combination of colors of the yellowish white particles 5a and the colored particles 5b and the number of such particles gathered in the first electrodes 3 and the second electrode 4. It is also possible to increase the whiteness in display of the changed color of the white particles 5a by suitably selecting the organic material 92 of the transmission part 9 according to the changed color of the white particles 5a.

3 Method for Manufacturing Electrophoresis Apparatus

An electrophoresis apparatus 20 can be manufactured in the following manner. Description will now be made on a method for manufacturing the electrophoresis apparatus 20.

FIGS. 3A to 3D and FIGS. 4E to 4G are pattern diagrams for explaining a method for manufacturing the electrophoresis apparatus shown in FIG. 1. Hereinafter, the upper side in these figures will be referred to as "top" and the lower side will be referred to as "lower".

3-1 Step of Producing Microcapsules 40

Produced first are a plurality of microcapsules 40 that encapsulate the electrophoretic dispersion liquid 10. Examples of a method for producing the microcapsules 40 (a method for encapsulating the electrophoretic dispersion liquid 10 into each capsule body 401) includes, but are not particularly limited to, various kinds of micro-encapsulating methods such as an interfacial polymerization method, an in-situ polymerization method, a phase separation method (or a coacervation method), an interfacial sedimentation method, a spraying and drying method and the like.

In this regard, it is to be noted that the micro-encapsulating methods mentioned above may be suitably selected depending on a constituent material of the microcapsules 40 and so forth.

The microcapsules 40 can be produced into a uniform size by use of, e.g., a sieving and separating method, a filtering method, a specific gravity difference sorting method, and the like.

An average diameter of the microcapsules 40 is preferably in the range of about 5 to 50 μm and more preferably in the range of about 10 to 30 μm. If the average diameter of the microcapsules 40 falls within the above-noted range, it becomes possible to more reliably control an electrophoretic movement of the electrophoretic particles 5 in the electrophoresis apparatus 20 manufactured.

3-2 Step of Preparing Microcapsule Dispersion Liquid

Next, microcapsule dispersion liquid is prepared by mixing the microcapsules 40 produced as described above with a binder 41.

A content of the microcapsules 40 in the microcapsule dispersion liquid is preferably in the range of about 10 to 80 wt % and more preferably in the range of about 30 to 60 wt %. If the content of the microcapsules 40 falls within the above-noted range, the microcapsules 40 are not overlapped in their thickness direction (the microcapsules 40 form a single layer). This is very advantageous in moving (or rearranging) the microcapsules 40 in the microcapsule-containing layer 400.

3-3 Step of Forming Transmission Part 9 (First Step)

Figure 3A:
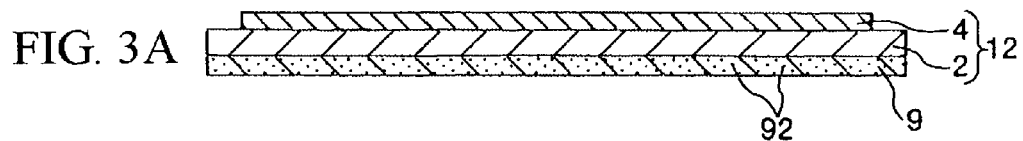
FIGS. 3A to 3D are pattern diagrams for explaining a method for manufacturing the electrophoresis apparatus shown in FIG. 1.

In the meantime, a transmission part 9 is formed on the substrate 12. That is to say, as illustrated in FIG. 3A, a liquid-phase material containing an organic material 92 that constitutes the transmission part 9 is supplied to a surface of the base portion 2 opposite from the second electrode 4.

The liquid-phase material is constituted of the organic material 92 constituting the transmission part 9, a binder material and a dispersion medium. The liquid-phase material can be prepared by mixing them. In this regard, it is to be noted that the dispersion medium may be the same as the liquid-phase dispersion medium 6 mentioned earlier.

Examples of a method for supplying the dispersion medium to the base portion 2 include: a dipping method, a spin coating method, a casting method, a micro-gravure coating method, a gravure coating method, a bar coating method, a roll coating method, a wire bar coating method, a dip coating method, a spray coating method, a screen printing method, a flexographic printing method, an offset printing method, an inkjet method, and a micro-contact printing method. One or more of these methods may be used independently or in combination.

Among these methods, it is preferable to use the inkjet method (a liquid droplet ejecting method) or the spin coating method. Use of the inkjet method makes it possible to easily form the transmission part 9 with increased dimensional accuracy. Use of the spin coating method makes it possible to uniformly form the transmission part 9.

3-4 Step of Forming Microcapsule-Containing Layer (Second Step)

Figure 3B:
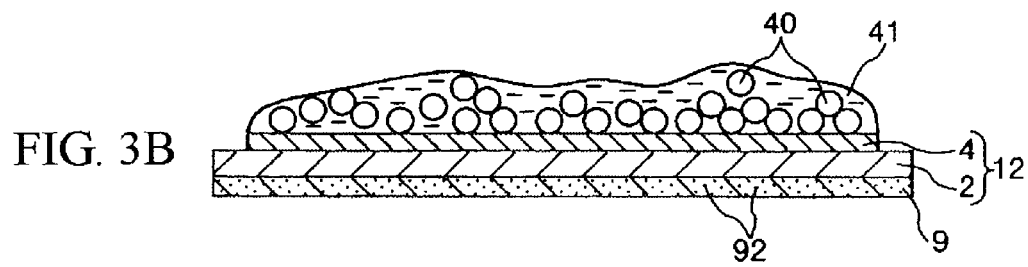

Next, as illustrated in FIG. 3B, the microcapsule dispersion liquid prepared in step [2] is supplied onto the second electrode 4 of the substrate 12 obtained in step [3]. Examples of a method for supplying the microcapsule dispersion liquid onto the second electrode 4 of the substrate 12 include various kinds of application methods such as a spin coating method, a dip coating method, a spray coating method and the like.

Figure 3C:
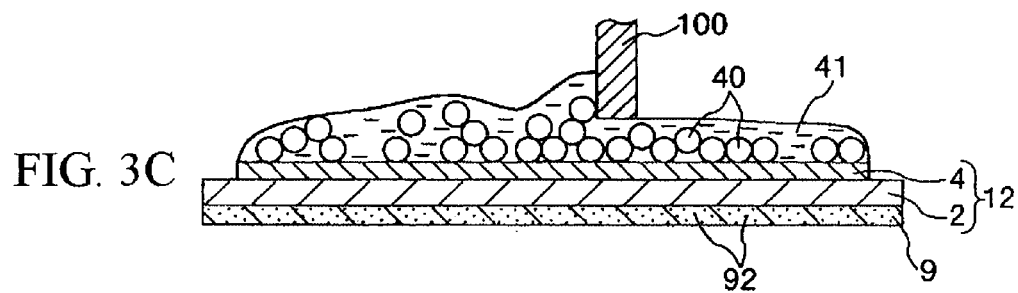

If necessary, the microcapsule dispersion liquid is leveled to ensure that a thickness (or the quantity) of the microcapsule dispersion liquid becomes uniform on the second electrode 4 of the substrate 12. More preferably, the microcapsule dispersion liquid is leveled so that the microcapsules 40 should not be overlapped in their thickness direction (so that the microcapsules 40 are disposed one by one in a single layer). The leveling task may be performed by, e.g., drawing a squeezee (a plate-like tool) 100 across the second electrode 4 of the substrate 12 and sweeping the microcapsules 40 as illustrated in FIG. 3C.

Figure 3D:
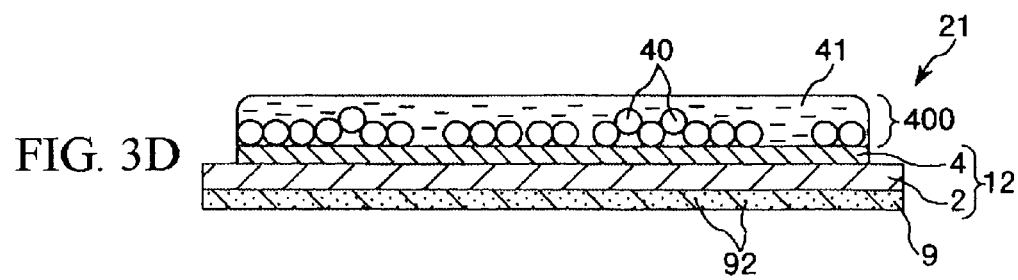

In this way, the microcapsule-containing layer 400 is formed to thereby obtain the electrophoretic sheet 21 as illustrated in FIG. 3D.

3-5 Step of Forming Adhesive Agent Layer (Third Step)

Figure 4E:
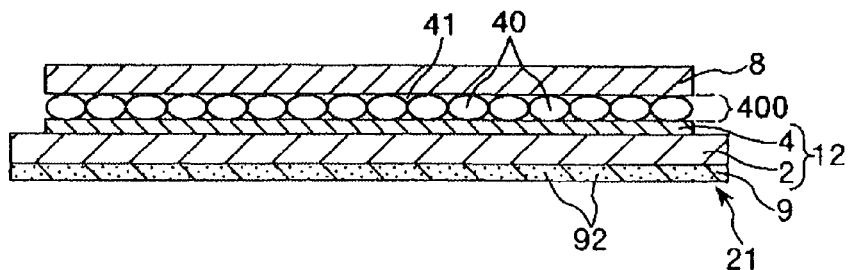

Next, as illustrated in FIG. 4E, the adhesive agent layer 8 is formed on the microcapsule-containing layer 400. This step is performed by, e.g., disposing a sheet-like adhesive agent layer on the microcapsule-containing layer 400 by use of a transfer method or the like.

3-6 Step of Bonding Circuit Board 22 (Fourth Step)

Figure 4F:
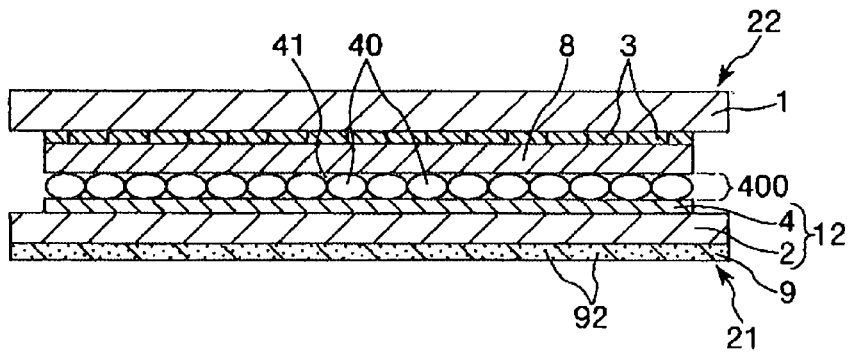

Next, as illustrated in FIG. 4F, the circuit board 22 produced separately is superimposed on the adhesive agent layer 8 in such a way that the first electrodes 3 make contact with the adhesive agent layer 8. This ensures that the electrophoretic sheet 21 and the circuit board 22 are bonded together by means of the adhesive agent layer 8.

3-7 Sealing Step

Figure 4G:
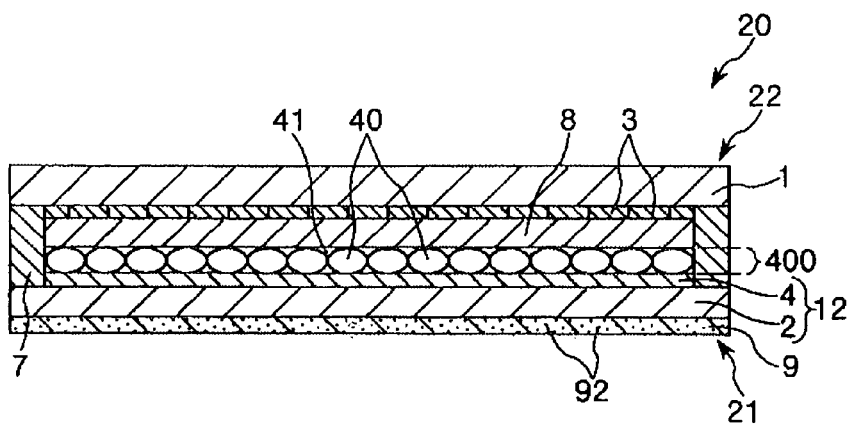

Next, as illustrated in FIG. 4G, the sealing part 7 is formed in such a manner as to be provided between the base portions 1 and 2 and to extend along the edge portions of the first electrodes 3, the second electrode 4 and the microcapsule-containing layer 400, and the adhesive agent layer 8.

In this step, a material for forming the sealing part 7 along the edge portions of the first electrodes 3, the second electrode 4, the microcapsule-containing layer 400, and the adhesive agent layer 8 is supplied to between the base portions 1 and 2 by means of, e.g., a dispenser or the like. The sealing part 7 can be formed by solidifying or curing the material thus supplied.

The electrophoresis apparatus 20 is manufactured by way of the afore-mentioned steps.

In this regard, it is to be noted that in the bonding step [6] of the present embodiment, the microcapsules 40 can be deformed by using the own weight of the adhesive agent layer 8 and the circuit board 22 or, if needed, by pressing the circuit board 22 and the electrophoretic sheet 21 to move toward each other (by reducing the thickness of the microcapsule-containing layer 400) (see FIG. 4F).

This ensures that the arranging density of the microcapsules 40 in every region of the microcapsule-containing layer 400 can be made uniform. This also makes it possible to reliably form the microcapsules 40 into a stone-wall structure (a flat shape). Consequently, there is provided an electrophoresis apparatus 20 that exhibits superior performance in terms of a contrast, a response speed and so forth.

With the present invention, the pressing operation is not essential in bonding the electrophoretic sheet 21 and the circuit board 22 together. Therefore, it is possible to prevent the electrophoretic dispersion liquid 10 from bleeding out from the microcapsules 40. It is also possible to prevent the circuit board 22 from being adversely affected by the pressing operation.

In addition, the adhesive agent layer 8 may be provided on the circuit board 22 or on both the circuit board 22 and the electrophoretic sheet 21 to bond the circuit board 22 and the electrophoretic sheet 21 together.

Furthermore, it is preferable to dispose the adhesive agent layer 8 on the microcapsule-containing layer 400 by, e.g., bending the sheet-like adhesive agent layer 8, bringing one end portion thereof into contact with the microcapsule-containing layer 400 and then allowing the remaining portion to make contact with the microcapsule-containing layer 400 sequentially from the one end portion toward the other end portion. This makes it possible to prevent generation of bubbles in between the microcapsule-containing layer 400 and the adhesive agent layer 8 and also to rearrange the microcapsules 40 in a reliable manner.

Moreover, in step [3] of forming the transmission part 9, the electrophoresis apparatus 20 may be first manufactured without forming the transmission part 9 and, subsequently, the transmission part 9 may be formed on the substrate 12.

Second Embodiment

Next, description will be made on a second embodiment of an electrophoresis apparatus to which an electrophoretic sheet of the present invention is applied.

FIG. 5 is a pattern diagram showing a vertical section of a second embodiment of the electrophoresis apparatus according to the present invention. Hereinafter, the upper side in FIG. 5 will be referred to as "upper" and the lower side will be referred to as "lower" for the purpose of convenience in description.

An electrophoresis apparatus of the second embodiment will now be described with emphasis placed on the points differing from the electrophoresis apparatus of the first embodiment set forth above. Description will be omitted regarding the same matters.

The electrophoresis apparatus 20 shown in FIG. 5 is the same as the electrophoresis apparatus 20 of the first embodiment, except that the transmission part 9 is not formed on the upper surface of the base portion 2 and the base portion 2 serves as a transmission part 9. With the electrophoresis apparatus 20 of the present embodiment, the organic material 92 which would otherwise constitute the transmission part 9 is included in the base portion 2.

Inclusion of the organic material 92 in the base portion 2 eliminates the need to separately provide the transmission part 9 unlike the first embodiment, thereby making it possible to manufacture the electrophoresis apparatus 20 in a simplified manner.

Furthermore, even if light having a wavelength of a low wavelength side of a visible light region (blue wavelength light) shows a reduction in the transmission ratio due to the constituent material of the base portion 2, since a part of the blue wavelength light is reflected by the organic material 92 contained the base portion 2, the yellow wavelength light reflected by the yellowish white particles 5a and transmitted through the base portion 2 is counterbalanced by the blue wavelength light reflected by the organic material 92 contained in the base portion 2. As a result, it is possible to increase the whiteness in display of the yellowish white particles 5a.

A method for manufacturing the electrophoresis apparatus 20 of the present embodiment is the same as that of the first embodiment, except that the base portion 2 containing the organic material 92 is used instead of forming the transmission part 9 on the surface of the base portion 2 opposite from the second electrode 4 in step [3] of the first embodiment.

In this regard, it is to be noted that the present embodiment is the same as the first embodiment in terms of the organic material 92, the content thereof, the binder material, the thickness of the base portion 2 and the transmittance of the light having the wavelength in the range of 400 to 700 nm.

Third Embodiment

Next, description will be made on a third embodiment of an electrophoresis apparatus to which an electrophoretic sheet of the present invention is applied.

Figure 6:
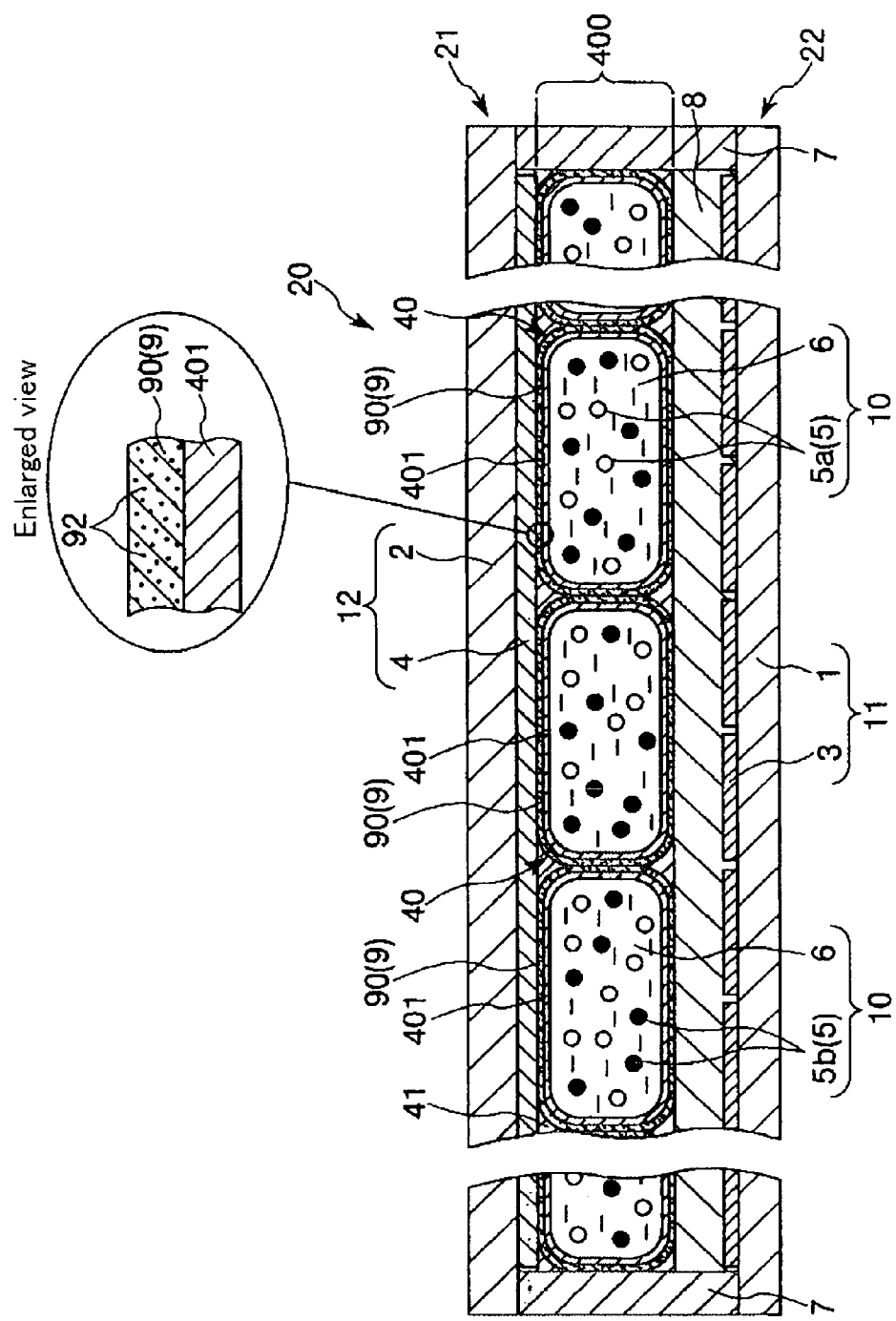
FIG. 6 is a pattern diagram showing a vertical section of a third embodiment of the electrophoresis apparatus according to the present invention.

FIG. 6 is a pattern diagram showing a vertical section of a third embodiment of the electrophoresis apparatus according to the present invention. Hereinafter, the upper side in FIG. 6 will be referred to as "upper" and the lower side will be referred to as "lower" for the purpose of convenience in description.

An electrophoresis apparatus of the third embodiment will now be described with emphasis placed on the points differing from the electrophoresis apparatus of the first embodiment set forth above. Description will be omitted regarding the same matters.

The electrophoresis apparatus 20 shown in FIG. 6 is the same as the electrophoresis apparatus 20 of the first embodiment, except that a cover layer 90 constituting a transmission part 9 is provided so as to cover the outer circumferential surface of the capsule bodies 401, instead of forming the transmission part 9 on the upper surface of the base portion 2.

Although there is no particular limitation, a thickness of the cover layer 90 is preferably in the range of about 0.1 to 10 μm and more preferably in the range of about 1 to 5 μm.

If the thickness of the cover layer 90 falls within the above-noted range, it becomes possible to form the microcapsule-containing layer 400 with increased dimensional accuracy and, consequently, to manufacture the electrophoresis apparatus 20 into a suitable size. Furthermore, there is no possibility that the thickness of the cover layer 90 becomes too great, which assists in properly controlling intensity of a voltage applied to the electrophoresis apparatus 20.

Provision of the cover layer 90 on the capsule body 401 eliminates the need to separately form the transmission part 9 on the upper surface of the base portion 2, thereby making it possible to reduce the size of the electrophoresis apparatus 20.

In addition, when the electrophoresis apparatus 20 is observed from the top thereof, the cover layer 90 is seen as if it is formed over the entire surface of the microcapsule-containing layer 400. This is because each capsule body 401 is covered with the cover layer 90.

As a result, it is possible to absorb the yellow wavelength light in the organic material 92 contained in the cover layer 90 with increased efficiency, thereby counterbalancing the yellow wavelength light. And it is also possible to uniformly display the whiteness of the yellowish white particles 5a.

A method for manufacturing the electrophoresis apparatus 20 of the present embodiment is the same as that of the first embodiment, except that the cover layer 90 is formed by dipping the microcapsules 40 in a liquid-phase material containing the organic material 92 after the microcapsules 40 have been produced in step [1] of the first embodiment.

In this regard, it is to be noted that the present embodiment is the same as the first embodiment in terms of the organic material 92, the content thereof, the binder material and the transmittance of the light having the wavelength in the range of 400 to 700 nm.

Fourth Embodiment

Next, description will be made on a fourth embodiment of an electrophoresis apparatus to which an electrophoretic sheet of the present invention is applied.

Figure 7:
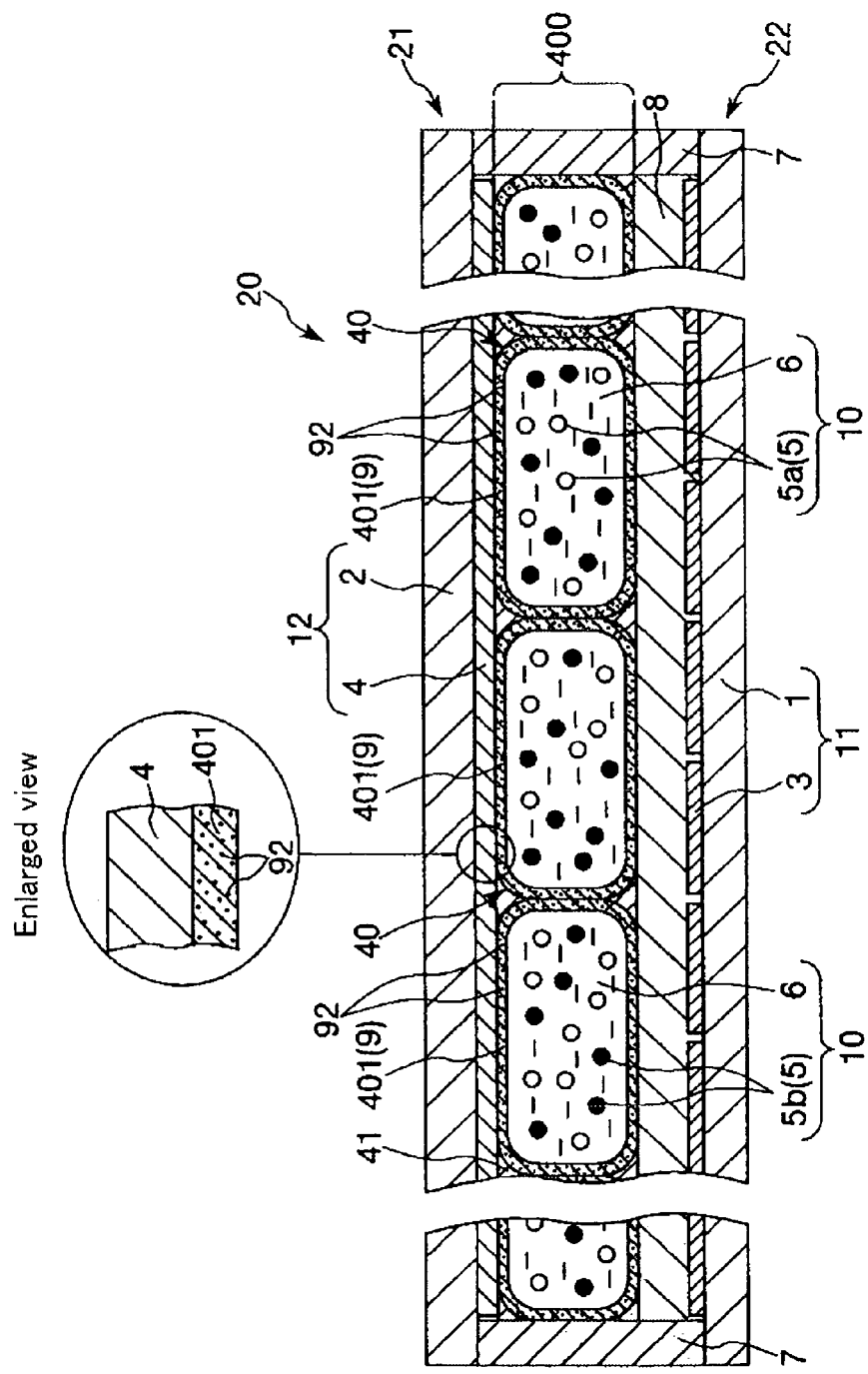
FIG. 7 is a pattern diagram showing a vertical section of a fourth embodiment of the electrophoresis apparatus according to the present invention.

FIG. 7 is a pattern diagram showing a vertical section of a fourth embodiment of the electrophoresis apparatus according to the present invention. Hereinafter, the upper side in FIG. 7 will be referred to as "upper" and the lower side will be referred to as "lower" for the purpose of convenience in description.

An electrophoresis apparatus of the fourth embodiment will now be described with emphasis placed on the points differing from the electrophoresis apparatus of the first embodiment set forth above. Description will be omitted regarding the same matters.

The electrophoresis apparatus 20 shown in FIG. 7 is the same as the electrophoresis apparatus 20 of the first embodiment, except that the transmission part 9 is not formed on the upper surface of the base portion 2 and each capsule body 401 itself serves as a transmission part 9.

In other words, with the electrophoresis apparatus 20 of the present embodiment, each capsule body 401 includes the organic material 92 that would otherwise constitute the transmission part 9.

Inclusion of the organic material 92 in each capsule body 401 eliminates the need to separately provide the transmission part 9 unlike the first embodiment, thereby making it possible to manufacture the electrophoresis apparatus 20 in a further simplified manner.

A method for manufacturing the electrophoresis apparatus 20 of the present embodiment is the same as that of the first embodiment, except that each capsule body 401 is produced by mixing the constituent material of the capsule body 401 with the organic material 92 in step [1] of the first embodiment.

In this regard, it is to be noted that the present embodiment is the same as the first embodiment in terms of the organic material 92, the content thereof, the binder material and the transmittance of the light having the wavelength in the range of 400 to 700 nm.

Although the organic material 92 is included in each capsule body 401 according to the above-described embodiment, it may be possible to form a transmission part 9 on the inner circumferential surface of each capsule body 401.

Fifth Embodiment

Next, description will be made on a fifth embodiment of an electrophoresis apparatus to which an electrophoretic sheet of the present invention is applied.

Figure 8:
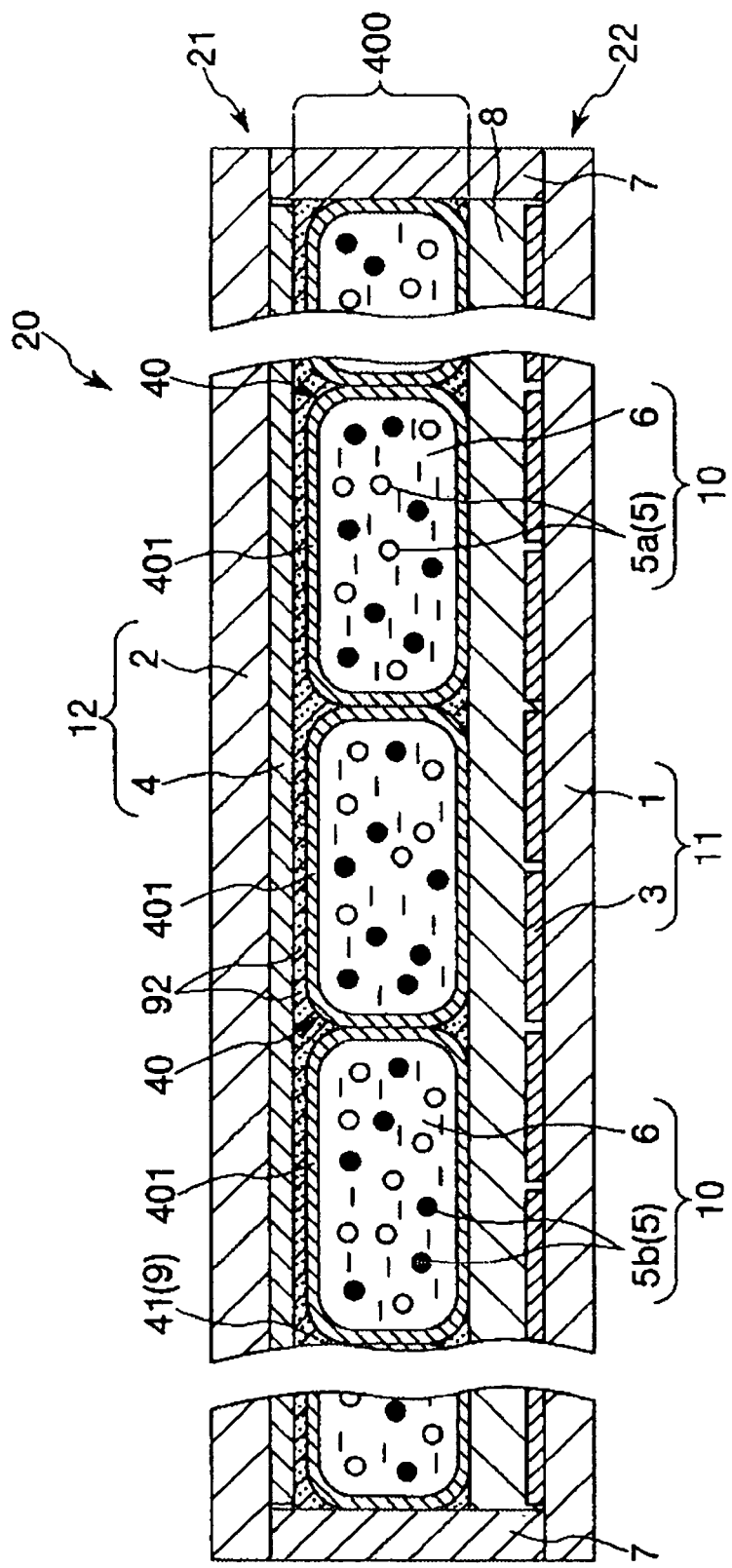
FIG. 8 is a pattern diagram showing a vertical section of a fifth embodiment of the electrophoresis apparatus according to the present invention.

FIG. 8 is a pattern diagram showing a vertical section of a fifth embodiment of the electrophoresis apparatus according to the present invention. Hereinafter, the upper side in FIG. 8 will be referred to as "upper" and the lower side will be referred to as "lower" for the purpose of convenience in description.

An electrophoresis apparatus of the fifth embodiment will now be described with emphasis placed on the points differing from the electrophoresis apparatus of the first embodiment set forth above. Description will be omitted regarding the same matters.

The electrophoresis apparatus 20 shown in FIG. 7 is the same as the electrophoresis apparatus 20 of the first embodiment, except that the transmission part 9 is not formed on the upper surface of the base portion 2 but formed of the binder 41 of the microcapsule-containing layer 400.

In other words, with the electrophoresis apparatus 20 shown in FIG. 8, the organic material 92 constituting the transmission part 9 is included in the binder 41 of the microcapsule-containing layer 400.

Inclusion of the organic material 92 in the binder 41 of the microcapsule-containing layer 400 eliminates the need to separately provide the transmission part 9 unlike the first embodiment, thereby making it possible to manufacture the electrophoresis apparatus 20 in a further simplified manner.

Furthermore, a layer of the binder 41 is formed between the microcapsules 40 and the second electrode 4 as shown in FIG. 8. Therefore, when the electrophoresis apparatus 20 is observed from the top thereof, the transmission part 9 is seen to extend over the entirety of the upper surface of the microcapsule-containing layer 400. As a result, it is possible to absorb the yellow wavelength light in the organic material 92 contained in the binder 41 with increased efficiency, thereby counterbalancing the yellow wavelength light. And it is also possible to uniformly display the whiteness of the yellowish white particles 5a.

A method for manufacturing the electrophoresis apparatus 20 of the present embodiment is the same as that of the first embodiment, except that the microcapsule dispersion liquid is prepared by mixing the organic material 92 with the microcapsules 40 and the binder 41 in step [2] of the first embodiment.

In this regard, it is to be noted that the present embodiment is the same as the first embodiment in terms of the organic material 92, the content thereof, the binder material and the transmittance of the light having the wavelength in the range of 400 to 700 nm.

Sixth Embodiment

Next, description will be made on a sixth embodiment of an electrophoresis apparatus to which an electrophoretic sheet of the present invention is applied.

Figure 9:
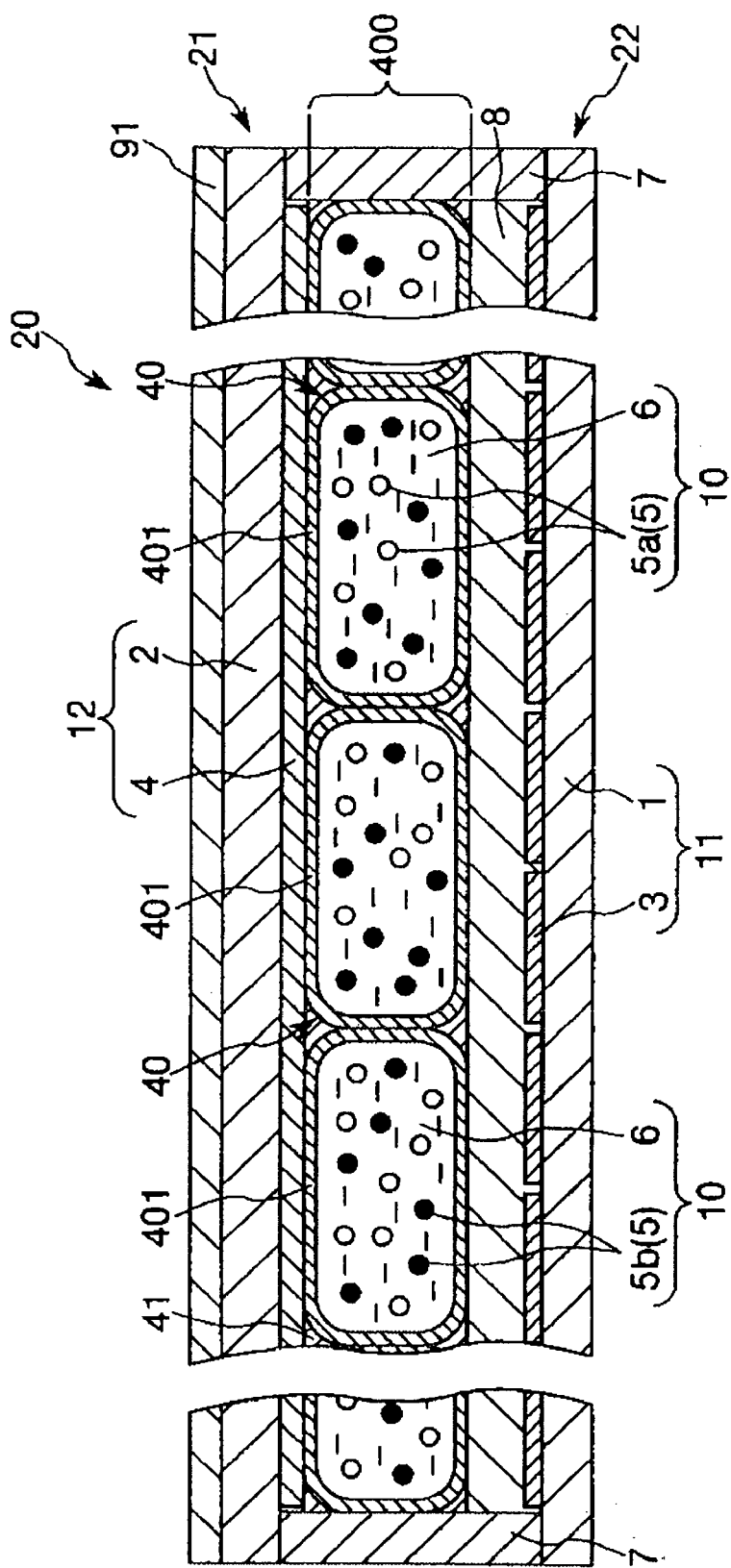
FIG. 9 is a pattern diagram showing a vertical section of a sixth embodiment of the electrophoresis apparatus according to the present invention.

FIG. 9 is a pattern diagram showing a vertical section of a sixth embodiment of the electrophoresis apparatus according to the present invention. Hereinafter, the upper side in FIG. 9 will be referred to as "upper" and the lower side will be referred to as "lower" for the purpose of convenience in description.

An electrophoresis apparatus of the sixth embodiment will now be described with emphasis placed on the points differing from the electrophoresis apparatus of the first embodiment set forth above. Description will be omitted regarding the same matters.

The electrophoresis apparatus 20 shown in FIG. 9 is the same as the electrophoresis apparatus 20 of the first embodiment, except that a reflection part 91 rather than the transmission part 9 is formed on the upper surface of the base portion 2.

In addition to the organic material 92 constituted the transmission part 9, an inorganic material may be used as a constituent material of the reflection part 91. Examples of such an inorganic material include: inorganic oxide such as silicon oxide, aluminum oxide, zirconium oxide, zinc oxide and the like; and inorganic nitride such as silicon nitride, aluminum nitride, zirconium nitride, zinc nitride and the like. Two or more of these materials may be used in combination.

The reflection part 91 may be in the form of, e.g., a thin film made of crystalline or amorphous inorganic materials, a particulate-containing film made of inorganic materials, or the like. Examples of the particulate-containing film made of inorganic materials include a film produced by dispersing particulates in a binder such as an organic resin binder, an inorganic binder or the like.

The reflect part 91 is formed from an optical film. It is preferred that a thickness of the optical film is equal to ¼ of the wavelength of blue light. More specifically, the thickness of the optical film is preferably equal to ¼ of a wavelength (400 to 700 nm) of the colors constituting a hue circle, i.e., 100 to 175 nm. This ensures that the blue wavelength light is selectively reflected with increased efficiency and the yellow wavelength light is transmitted efficiently.

Thus, the yellow wavelength light of the yellowish white particles 5a transmitted through the reflection part 91 is counterbalanced by the blue wavelength light reflected on the reflection part 91, thereby counterbalancing the whiteness in display of the yellowish white particles 5a.

A reflectance of the blue wavelength light is preferably in the range of 5 to 25% and more preferably in the range of 10 to 20%.

Although the reflection part 91 is of a single layer in the above description, it may be a multilayer lamination film produced by laminating a plurality of optical thin films one atop another. In this case, a thickness of the multilayer lamination film is set to fall within the above-noted film thickness range. The constituent material of the reflection part 91 set forth above are used in arbitrary combination in order to form each layer of the multilayer lamination film.

If the electrophoresis apparatus 20 is provided with the reflection part 91 formed on the upper surface of the base portion 2 as mentioned above, the blue wavelength light among light incident on the reflection part 91 from the outside of the electrophoresis apparatus 20 is efficiently reflected by the reflection part 91. Thus, the yellow wavelength light of the yellowish white particles 5a transmitted through the reflection part 91 is counterbalanced by the blue wavelength light, thereby increasing the whiteness in display of the yellowish white particles 5a.

Even if light having a wavelength of a low wavelength side of a visible light region (blue wavelength light) shows a reduction in the transmission ratio due to the constituent material of the base portion 2, since the reflection part 91 which reflects the blue wavelength light is formed on the base portion 2, it is possible to compensate the reduction of the transmission ratio. Therefore, the yellow wavelength light of the yellowish white particles 5a transmitted through the reflection part 91 is counterbalanced by the blue wavelength light reflected the reflection part 91. As a result, it is possible to further increase the whiteness in display of the yellowish white particles 5a.

In this regard, it is to be noted that in the first embodiment described above, the transmission part 9 may be replaced by the reflection part 91.

Electronic Device

The electrophoresis apparatus 20 described above can find its application in a variety of electronic devices. Hereinafter, description will be made on examples of the electronic device of the present invention provided with the electrophoresis apparatus 20.

Electronic Paper

Figure 10:
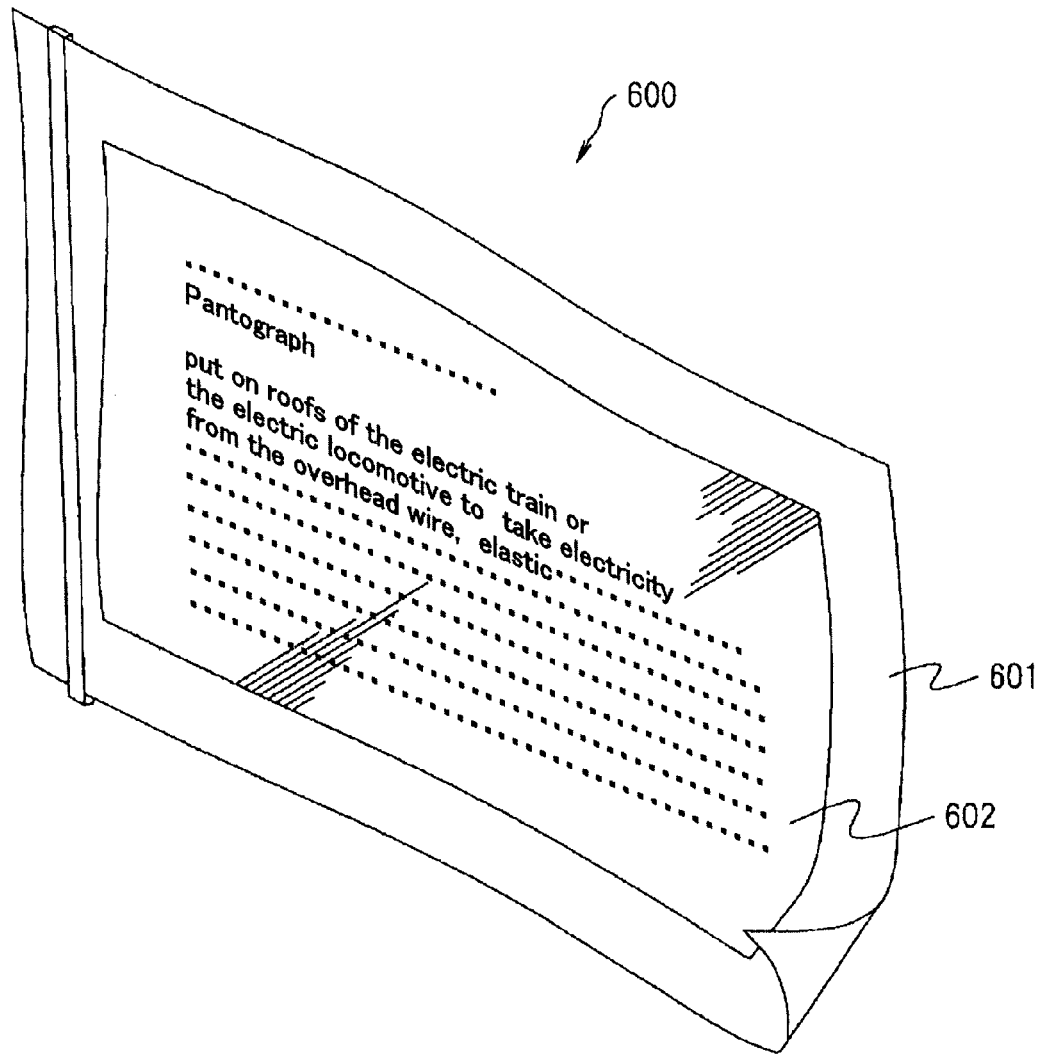
FIG. 10 is a perspective view showing an embodiment in which an electronic device of the present invention is applied to an electronic paper.

First, description will be offered regarding an embodiment in which an electronic device of the present invention is applied to an electronic paper. FIG. 10 is a perspective view showing an embodiment in which an electronic device of the present invention is applied to an electronic paper.

The electronic paper 600 shown in FIG. 10 includes a main body 601 formed of a rewritable sheet having the same texture and flexibility as that of a paper sheet, and a display unit 602 attached to the main body 601. In the electronic paper 600, the display unit 602 is formed of the electrophoresis apparatus 20 described above.

Display Device

Figure 11A:
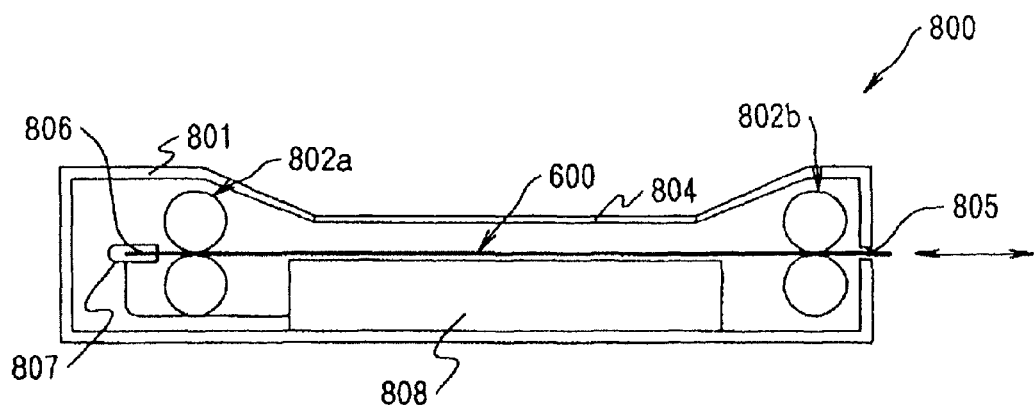
FIG. 11A and FIG. 11B are section and plan views showing an embodiment in which an electronic device of the present invention is applied to a display device.
Figure 11B:
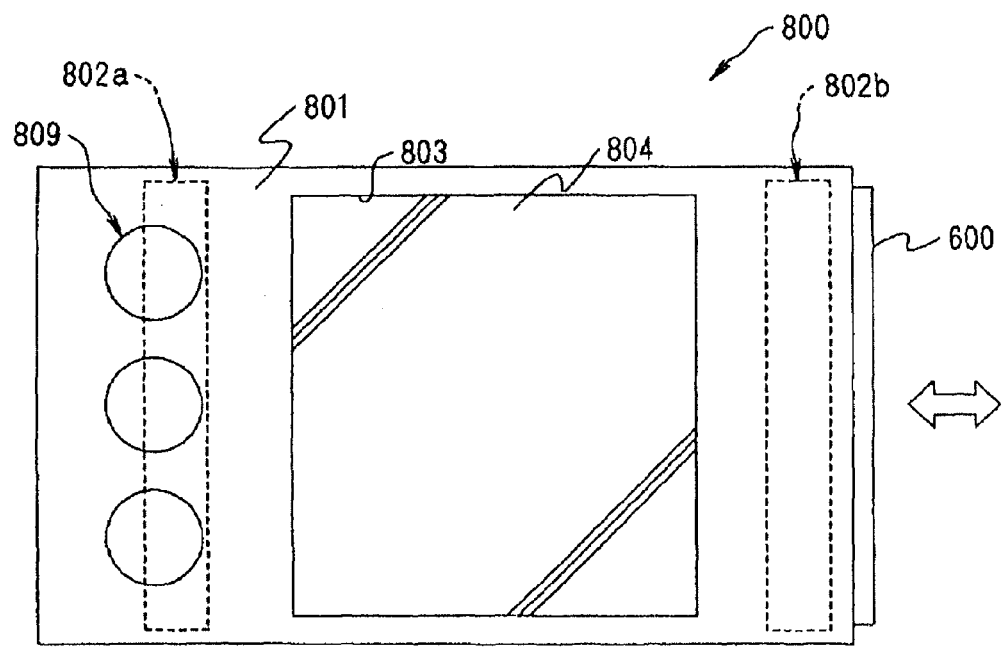

Next, description will be offered regarding an embodiment in which an electronic device of the present invention is applied to a display device. FIGS. 11A and 11B are section and plan views showing an embodiment in which an electronic device of the present invention is applied to a display device.

The display device 800 shown in FIGS. 11A and 11B include a main body portion 801 and an electronic paper 600 detachably attached to the main body portion 801. The electronic paper 600 is of the same configuration as set forth above, i.e., the same configuration as shown in FIG. 10.

Formed on one lateral side (the right side in FIG. 11A) of the main body portion 801 is an insertion slot 805 through which the electronic paper 600 can be inserted. Two pairs of conveying rollers 802a and 802b are provided within the main body portion 801.

When the electronic paper 600 is inserted into the main body portion 801 through the insertion slot 805, the electronic paper 600 is held within the main body portion 801 in a state that it is gripped by means of the pairs of conveying rollers 802a and 802b.

A rectangular opening 803 is formed on a display surface side (the front side in FIG. 11B) of the main body portion 801 (FIG. 11B) and a transparent glass plate 804 is fitted to the rectangular opening 803. This allows the electronic paper 600 held within the main body portion 801 to be visually recognized from the outside of the main body portion 801.

In other words, the display device 800 has a display surface that allows the electronic paper 600 held within the main body portion 801 to be visually recognized through the transparent glass plate 804.

A terminal portion 806 is formed in a leading edge portion (the left side in FIGS. 11A and 11B) of the electronic paper 600. Provided within the main body portion 801 is a socket 807 that makes contact with the terminal portion 806 when the electronic paper 600 is placed within the main body portion 801. A controller 808 and an operation part 809 are electrically connected to the socket 807.

In the display device 800 set forth above, the electronic paper 600 is removably fitted to the main body portion 801 and is portable in a state that it is removed from the main body portion 801. Furthermore, the electronic paper 600 of the display device 800 is formed from the electrophoresis apparatus 20 described above.

In this regard, it is to be noted that the electronic device of the present invention is not limited to the applications as described above. Examples of other applications of the electronic device include a television set, a viewfinder type or monitor viewing type video tape recorder, a car navigation system, a pager, a personal digital assistance, an electronic calculator, an electronic newspaper, a word processor, a personal computer, a workstation, a picture phone, a POS terminal, a device provided with a touch panel and the like. The present electrophoresis apparatus 20 can be applied to display parts of the various kinds of electronic devices described above.

Although the electrophoretic sheet, the electrophoresis apparatus, the method for manufacturing the electrophoresis apparatus and the electronic device of the present invention have been described with reference to the illustrated embodiments, the present invention is not limited thereto. The configuration of each component may possibly be replaced by other arbitrary configurations having equivalent functions. It may also be possible to add other optional components to the present invention.

Furthermore, the electrophoresis apparatus of the present invention may be provided by combining two or more arbitrary configurations (features) employed in the respective embodiments described above. For example, the electrophoresis apparatus of the present invention may be a combination of the configurations of the first and third embodiments, a combination of the configurations of the second and fourth embodiments, or a combination of the configurations of the first and fifth embodiments.

Although a pair of mutually facing electrodes is employed in the electrophoresis apparatus of the foregoing embodiments, the present invention is not limited thereto and may be applied to, e.g., an electrophoresis apparatus in which a pair of electrodes is formed on one and the same substrate.

Further, although a pair of mutually facing substrate is employed in the electrophoresis apparatus of the foregoing embodiments, the present invention is not limited thereto and may be applied to, e.g., an electrophoresis apparatus having a single substrate.

Furthermore, although each of the microcapsules is arranged to extend over two neighboring pixel electrodes in the foregoing embodiments, the present invention is not limited thereto. As an alternative example, each of the microcapsules may be arranged to extend over three neighboring pixel electrodes or may be arranged not to extend over neighboring electrodes. It may also be possible to employ the combination of these arrangements.

In the method for manufacturing electrophoresis apparatus of the present invention, one or more step may be added for an arbitrary purpose.

EXAMPLES

Next, experimental examples of the present invention will be described in detail.

1 Manufacture of Electrophoresis Apparatus

Example 1

1-1 Production of Microcapsules

Prepared first were spherical white particles having an average particle diameter of 200 nm and spherical black particles having an average particle diameter of 60 nm. Titanium oxide particles (CR-90 manufactured by Ishihara Sangyo Kaisha, Ltd.) were used as the white particles and carbon black particles were used as the black particles.

Then, electrophoretic dispersion liquid was prepared by dispersing the white particles and the black particles in a liquid-phase dispersion medium in a weight ratio of 50 to 50. IsoparM (a product of Exxon-Mobil Chemical Company) was used as the liquid-phase dispersion medium.

The electrophoretic dispersion liquid was allowed to fall in drops on a gelatin solution and stirred by a stirrer at a rotational speed of 1300 rpm.

Next, pH of the solution was controlled to 3.7 using acetic acid and, thereafter, capsules were precipitated by ice-cooling the solution. Formaldehyde was added to form a cross-linking structure in the capsules to the solution.

Microcapsules (having an average particle diameter of 20 $\mu$m) were obtained by continuously stirring the capsules for one day and one night and sorting the capsules.

1-2 Preparation of Microcapsule Dispersion Liquid

The microcapsules thus obtained were mixed with a binder in a weight ratio of 3 to 2, thereby preparing microcapsule dispersion liquid.

Used as the binder was copolymer resin obtained by mixing dodecyl methacrylate (having a melting point of 25° C. or less) and 2-ethyl hexyl methacrylate (having a melting point of 25° C. or less) in a weight ratio of 90 to 10 and polymerizing the mixture.

1-3 Formation of Transmission Part

Prepared next was a substrate having a second electrode made of ITO (OTEC220B, a PET-ITO substrate produced by Oike & Co., Ltd.).

Dispersion liquid was prepared by dispersing 0.1 g of partially sulfonated copper phthalocyanine as an organic material and 10 g of acrylic resin and 0.05 g of basic resin polyvinyl pyridine as a binder resin, which constitute a transmission part, in 500 mL of ethyl acetate.

The dispersion liquid was applied onto a PET layer of the PET-ITO substrate by a spin coating method at a spinning speed of 1300 rpm, thereby obtaining a PET-ITO substrate on which a transmission part is formed.

1-4 Formation of Microcapsule-Containing Layer

Next, the microcapsule dispersion liquid prepared in step (2) was applied onto an ITO layer of the PET-ITO substrate obtained in step (3) by means of a doctor blade method, thereby forming a microcapsule-containing layer with an average thickness of 30 $\mu$m.

1-5 Formation of Adhesive Agent Layer

Then, a sheet-like adhesive agent layer having an average thickness of 15 $\mu$m was prepared and placed on the microcapsule-containing layer at a normal temperature (25° C.). By doing so, the average thickness of the microcapsule-containing layer became about 15 $\mu$m. The microcapsules were deformed into a flat shape. That is to say, it was confirmed that the microcapsules were formed into a stone-wall structure.

Used as the adhesive agent layer was a mixture obtained by mixing polyurethane and EO-modified dicyclopentenyl metha acrylate in a weight ratio of 95 to 5.

1-6 Bonding of Circuit Board

A circuit board having first electrodes made of ITO was disposed on and bonded to the adhesive agent layer at a normal temperature (25° C.).

1-7 Sealing Step

Finally, edge portions (outer circumferential portions) of the structure (the first electrodes, the second electrode, the microcapsule-containing layer and the adhesive agent layer) thus obtained were sealed by use of an epoxy-based adhesive agent. By doing so, the electrophoresis apparatus as shown in FIG. 1 was obtained.

Example 2

An electrophoresis apparatus was obtained in the same manner as in Example 1 except that the PET-ITO substrate was changed to a CF-98 substrate produced by Toray Industries, Inc., and the dispersion liquid was not applied to the PET layer of the PET-ITO substrate in step (3) of Example 1.

In this regard, it was to be noted that in the PET-ITO substrate, i.e., the CF-98 substrate produced by Toray Industries, Inc., a layer that reflected the blue wavelength light (having a wavelength in the range of 380 to 460 nm) was formed on a PET layer.

Example 3

An electrophoresis apparatus was obtained in the same manner as in Example 1 except that the PET-ITO substrate was changed to a PET-organic conductive material substrate (OG-1, a product of Teijin DuPont Films Japan Limited) and the dispersion liquid was not applied to the PET layer of the PET-ITO substrate in step (3) of Example 1.

In this regard, it was to be noted that in the PET-organic conductive material substrate (OG-1, a product of Teijin DuPont Films Japan Limited), a layer that reflected the blue wavelength light (having a wavelength in the range of 380 to 460 nm) was formed on a PET layer.

Example 4

An electrophoresis apparatus was obtained in the same manner as in Example 1 except that the PET-ITO substrate was changed to a norbornene polymer-ITO substrate produced by JSR Corporation and the dispersion liquid was not applied to the PET layer of the PET-ITO substrate in step (3) of Example 1.

In this regard, it was to be noted that in the norbornene polymer-ITO substrate produced by JSR Corporation, a layer that reflected the blue wavelength light (having a wavelength in the range of 380 to 460 nm) was formed on a PET layer.

Example 5

An electrophoresis apparatus was obtained in the same manner as in Example 1 except that a substrate produced by mixing 0.1 g of partially sulfonated copper phthalocyanine with a PET layer of the PET-ITO substrate was used and the dispersion liquid was not applied to the PET layer of the PET-ITO substrate in step (3) of Example 1.

Example 6

The microcapsules obtained in step (1) of Example 1 were dipped into the dispersion liquid prepared in step (3) of Example 1 to form a cover layer on each of the microcapsules. Then, an electrophoresis apparatus was obtained in the same manner as in Example 1 except that step (3) of Example 1 was not carried out.

Example 7

An electrophoresis apparatus was obtained in the same manner as in Example 1 except that gelatin solution mixed with 0.1 g of partially sulfonated copper phthalocyanine was used and step (3) of Example 1 was not carried out.

Example 8

An electrophoresis apparatus was obtained in the same manner as in Example 1 except that microcapsule dispersion liquid mixed with 0.1 g of partially sulfonated copper phthalocyanine was used and step (3) of Example 1 was not carried out.

Example 9

An electrophoresis apparatus was obtained in the same manner as in Example 1 except that a silicon nitride film (with a thickness of 70 nm) was formed on a PET layer of the PET-ITO substrate by means of a plasma CVD method, instead of applying the dispersion liquid on the PET layer of the PET-ITO substrate in step (3) of Example 1.

In this regard, it was to be noted that the plasma CVD method was performed under the following conditions. A chamber was depressurized to 3 Pa and an argon gas was supplied into the chamber at a flow rate of 50 sccm. Argon plasma was generated by applying electric power of 500 W by use of a high-frequency power source.

On the other hand, silicon nitride heated and vaporized by a heater was supplied into the chamber at a flow rate of 50 sccm. The silicon nitride supplied into the chamber was allowed to react with the argon plasma for about five minutes, consequently forming a film of the silicon nitride on the PET surface side of the PET-ITO substrate.

Comparative Example 1

An electrophoresis apparatus was obtained in the same manner as in Example 1 except that the dispersion liquid was not applied to the PET-ITO substrate.

2 Evaluation

Evaluation of a color, a contrast, an image sharpness and CIE1976 (L*a*b*) color coordinate system (JIS Z 8729) was conducted with respect to each of the electrophoresis apparatuses obtained in the Examples 1 to 9 and the Comparative Example 1.

2-1 Color

The color of the white particles at the time when a direct current voltage of 15 V was applied twice for 0.4 second to between the electrodes of each of the electrophoresis apparatuses obtained in Examples 1 to 9 and Comparative Example 1 was visually confirmed and evaluated according to the following four-stage criteria A to D. The results of evaluation are collectively shown in Table 1.

In this regard, it was to be noted that the four-stage criteria included as follows.

A: No lemon yellow color was recognized (white color only).
B: Little Lemon yellow color was recognized.
C: A small bit of lemon yellow color was recognized.
D: Lemon yellow color was recognized conspicuously.

2-2 Contrast

A white reflectance and a black reflectance at the time when a direct current voltage of 15 V was applied twice for 0.4 second to between the electrodes of each of the electrophoresis apparatuses obtained in Examples 1 to 9 and Comparative Example 1 were measured by a Macbeth spectrophotometer/densitometer (SpectroEye, a product of Gretag Macbeth Corporation). The contrast was found by applying the measured values to an equation.

contrast=(white reflectance)/(black reflectance)

The results of evaluation are collectively shown in Table 1.

In this regard, it was to be noted that the white reflectance and the black reflectance were separately measured by applying a voltage while switching polarities (positive and negative poles). Each of the reflectance was a value measured over the entire display surface of the electrophoresis apparatus.

2-3 Image Sharpness

The image sharpness at the time when a direct current voltage of 15 V was applied twice for 0.4 second to between the electrodes of each of the electrophoresis apparatuses obtained in Examples 1 to 9 and Comparative Example 1 was visually confirmed and evaluated according to the following four-stage criteria A to D. The results of evaluation are collectively shown in Table 1.

In this regard, it was to be noted that the four-stage criteria included as follows.

A: Edges of an image were seen clearly.
B: Edges of an image were seen.
C: It was difficult to see edges of an image.
D: Edges of an image were not seen.

2-4 CIE1976 (L*a*b*) Color Coordinate System

The CIE1976 (L*a*b*) color coordinate system at the time when a direct current voltage of 15 V was applied twice for 0.4 second to between the electrodes of each of the electrophoresis apparatuses obtained in Examples 1 to 9 and Comparative Example 1 were measured by a Macbeth spectrophotometer/densitometer (SpectroEye, a product of Gretag Macbeth Corporation).

The results of evaluation are collectively shown in Table 1 in which the symbol L* denotes a lightness index and the symbols a* and b* stand for chromaticness indices.

TABLE 1

|  | Color | Contrast | Image sharpness | L* | a* | b* |
| --- | --- | --- | --- | --- | --- | --- |
| Ex. 1 | A | 6.8 | A | 65.87 | −1.88 | −0.92 |
| Ex. 2 | A | 6.5 | A | 67.03 | −1.94 | −1.08 |
| Ex. 3 | A | 6.9 | A | 70.11 | 0.64 | 0.79 |
| Ex. 4 | A | 6.9 | A | 69.89 | 1.44 | 0.50 |
| Ex. 5 | A | 6.6 | A | 67.26 | −1.10 | −0.93 |
| Ex. 6 | A | 6.5 | B | 65.03 | −0.06 | 0.01 |
| Ex. 7 | B | 6.4 | B | 64.63 | 0.50 | 0.85 |
| Ex. 8 | A | 6.5 | A | 65.31 | 0.60 | −0.79 |
| Ex. 9 | A | 6.6 | A | 66.24 | 0.18 | −0.52 |
| Comp. Ex. 1 | D | 6.0 | D | 60.33 | 2.81 | 2.66 |

As can be seen in Table 1, all of the electrophoresis apparatuses of the present invention exhibited superior color, contrast and image sharpness.

In particular, the electrophoresis apparatuses obtained in Examples 1 to 4, 5 and 9 were especially superior in the color, the contrast and the image sharpness. This is because the transmission part is formed on the substrate in Examples 1 to 4 and 9 and because the substrate serves as the transmission part in Example 5.

In all of the Examples, the value of L* was high, which means that the degree of whiteness is high. Particularly, in Examples 1, 2 and 5, the values of a* and b* were all negative, which means that the yellowish color of the yellowish white particles is counterbalanced and the white color is seen for the most parts.

In contrast, the color, the contrast and the image sharpness available in the Comparative Example 1 were all inferior to those of the Examples 1 to 9. This is because no transmission part is provided in the Comparative Example 1. Furthermore, the value of L* was small and the values of a* and b* were all positive, which means that the yellowish white particles are seen yellowish.

The above evaluation results show that provision of the transmission part makes it possible to counterbalance the whiteness of the yellowish white particles.

The invention claimed is:

1. An electrophoretic sheet comprising:
a substrate having one surface and the other surface;
a microcapsule-containing layer comprised of a plurality of microcapsules, the microcapsule-containing layer provided on the other surface of the substrate, each of the plurality of microcapsules having a capsule body and an electrophoretic dispersion liquid contained in the capsule body, the electrophoretic dispersion liquid containing a plurality of electrophoretic particles of at least one color, and the capsule body having an inner circumferential surface and an outer circumferential surface; and
at least one colored part provided on the external side of the inner circumferential surface of the capsule body of each of the plurality of microcapsules, and wherein each colored part has a color complementary to the color of the plurality of electrophoretic particles.

2. The electrophoretic sheet as claimed in claim 1, wherein each colored part is comprised of a transmission part which serves to transmit light having a wavelength of the color complementary to the color of the plurality of electrophoretic particles.

3. The electrophoretic sheet as claimed in claim 2, wherein the capsule body of each of the plurality of microcapsules serves as the transmission part.

4. The electrophoretic sheet as claimed in claim 2, wherein the transmission part is constituted from a cover layer which is formed on the outer circumferential surface of the capsule body of each of the plurality of microcapsules.

5. The electrophoretic sheet as claimed in claim 2, wherein the microcapsule-containing layer is comprised of the plurality of microcapsules and a binder having a function of keeping the plurality of microcapsules in the microcapsule-containing layer, wherein the binder serves as the transmission part.

6. The electrophoretic sheet as claimed in claim 2, wherein the substrate includes a base portion which forms the one surface of the substrate and a second electrode provided on the base portion, and wherein the base portion serves as the transmission part.

7. The electrophoretic sheet as claimed in claim 2, wherein transmittance of light having a wavelength in the range of 400 to 700 nm possessed by the transmission part is equal to or greater than 80%.

8. The electrophoretic sheet as claimed in claim 2, wherein the transmission part contains an organic material which absorbs light having a wavelength corresponding to the color of the plurality of electrophoretic particles.

9. The electrophoretic sheet as claimed in claim 8, wherein the organic material is constituted of organic pigment.

10. The electrophoretic sheet as claimed in claim 1, wherein the plurality of electrophoretic particles includes electrophoretic particles which are constituted of titanium oxide.

11. The electrophoretic sheet as claimed in claim 1, wherein the at least one color includes a white color and a black color, wherein the complementary color is a color complementary to a changed color of the white electrophoretic particles, and wherein the color change from the white color is changed by the elapse of time.

12. The electrophoretic sheet as claimed in claim 11, wherein the changed color includes a yellow or yellowish color and the complementary color includes a blue color.

13. An electrophoretic sheet comprising:
a substrate having one surface and the other surface;
a microcapsule-containing layer comprised of a plurality of microcapsules, the microcapsule-containing layer provided on the other surface of the substrate, each of the plurality of microcapsules having a capsule body and an electrophoretic dispersion liquid contained in the capsule body, the electrophoretic dispersion liquid containing a plurality of electrophoretic particles of at least one color, and the capsule body having an inner circumferential surface and an outer circumferential surface; and a reflection part provided on the one surface of the substrate, and wherein the reflection part reflects light having a wavelength of a color complementary to the color of the plurality of electrophoretic particles.

14. The electrophoretic sheet as claimed in claim 13, wherein the reflection part is formed from an optical film of which a thickness is in the range of 100 to 175 nm.

15. An electrophoresis apparatus comprising:
a substrate having one surface and the other surface, the substrate including a second electrode which forms the other surface of the substrate;
a microcapsule-containing layer comprised of a plurality of microcapsules, the microcapsule-containing layer provided on the other surface of the substrate, each of the plurality of microcapsules having a capsule body and an electrophoretic dispersion liquid contained in the capsule body, the electrophoretic dispersion liquid containing a plurality of electrophoretic particles of at least one color, and the capsule body having an inner circumferential surface and an outer circumferential surface;
an opposing substrate provided on the side of the microcapsule-containing layer on which no substrate is provided, the opposing surface having one surface and the other surface, the opposing substrate including a plurality of first electrodes which forms the one surface of the opposing surface; and
at least one colored part provided on the external side of the inner circumferential surface of the capsule body of each of the plurality of microcapsules, and wherein each colored part has a color complementary to the color of the plurality of electrophoretic particles.

16. The electrophoresis apparatus as claimed in claim 15, further comprising an adhesive agent layer which bonds the one surface of the opposing substrate to the microcapsule-containing layer.

17. An electronic device provided with the electrophoresis apparatus defined in claim 15.

18. A method for manufacturing an electrophoresis apparatus having a substrate, an opposing substrate, and a microcapsule-containing layer comprised of a plurality of microcapsules, each of the substrate and the opposing substrate having one surface and the other surface, the substrate including a second electrode which forms the other surface of the substrate, the opposing substrate including a plurality of first electrodes which forms the one surface of the opposing substrate, each of the microcapsules having a capsule body and an electrophoretic dispersion liquid contained in the capsule body, the electrophoretic dispersion liquid containing a plurality of electrophoretic particles of at least one color, the method comprising:
forming a colored part having a color complementary to the color of the plurality of electrophoretic particles on the one surface of the substrate;
forming the microcapsule-containing layer on the other surface of the substrate;
forming an adhesive agent layer on the microcapsule-containing layer; and
bonding the one surface of the opposing substrate on the adhesive agent layer.

19. A method for manufacturing an electrophoresis apparatus having a substrate, an opposing substrate, and a microcapsule-containing layer comprised of a plurality of microcapsules, each of the substrate and the opposing substrate having one surface and the other surface, the substrate including a second electrode which forms the other surface of the substrate, the opposing substrate including a plurality of first electrodes which forms the one surface of the opposing substrate, each of the microcapsules having a capsule body and an electrophoretic dispersion liquid contained in the capsule body, the electrophoretic dispersion liquid containing a plurality of electrophoretic particles of at least one color, the method comprising:
forming a reflection part reflecting light having the wavelength of a color complementary to the color of the plurality of electrophoretic particles on the one surface of the substrate;
forming the microcapsule-containing layer on the other surface of the substrate;
forming an adhesive agent layer on the microcapsule-containing layer; and
bonding the one surface of the opposing substrate on the adhesive agent layer.

* * * * *